United States Patent
Milosavljevic et al.

(10) Patent No.: US 8,768,800 B2
(45) Date of Patent: Jul. 1, 2014

(54) SYSTEM AND METHOD FOR INCOME PLANNER

(75) Inventors: Olga Milosavljevic, Oakland, CA (US); Mark De Vincenzi, Walnut Creek, CA (US); James Peterson, Walnut Creek, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 1354 days.

(21) Appl. No.: 09/880,170

(22) Filed: Jun. 12, 2001

(65) Prior Publication Data

US 2002/0188536 A1    Dec. 12, 2002

Related U.S. Application Data

(60) Provisional application No. 60/286,770, filed on Apr. 26, 2001.

(51) Int. Cl.
*G06Q 40/00* (2012.01)

(52) U.S. Cl.
USPC .............................. 705/35; 705/36 R; 705/37

(58) Field of Classification Search
USPC ................................................. 705/35, 36 R
See application file for complete search history.

(56) References Cited

U.S. PATENT DOCUMENTS

| | | | |
|---|---|---|---|
| 3,634,669 A | 1/1972 | Soumas et al. | 235/184 |
| 3,697,693 A | 10/1972 | Deschenes et al. | 179/2 |
| 4,007,355 A | 2/1977 | Moreno | 235/61.7 |
| 4,334,270 A | 6/1982 | Towers | 364/300 |
| 4,346,442 A | 8/1982 | Musmanno | 364/408 |
| 4,376,978 A | 3/1983 | Musmanno | 364/408 |
| 4,597,046 A | 6/1986 | Musmanno et al. | 364/408 |
| 4,642,767 A | 2/1987 | Lerner | 364/406 |
| 4,722,055 A | 1/1988 | Roberts | 364/408 |
| 4,742,457 A | 5/1988 | Leon et al. | 364/408 |
| 4,752,877 A | 6/1988 | Roberts et al. | 364/408 |
| 4,774,663 A | 9/1988 | Musmanno et al. | 364/408 |
| 4,868,376 A | 9/1989 | Lessin et al. | 235/492 |
| 4,876,648 A | 10/1989 | Lloyd | 364/408 |
| 4,885,685 A | 12/1989 | Wolfberg et al. | 364/401 |
| 4,910,676 A | 3/1990 | Alldredge | 364/408 |
| 4,933,842 A | 6/1990 | Durbin et al. | 364/408 |
| 4,953,085 A | 8/1990 | Atkins | 364/408 |

(Continued)

FOREIGN PATENT DOCUMENTS

| | | | | |
|---|---|---|---|---|
| EP | 0572281 A1 | 1/1993 | | 15/30 |
| WO | 96/06402 | 2/1996 | | 17/60 |
| WO | 98/13776 | 4/1998 | | 17/60 |
| WO | 98/44444 | 10/1998 | | |

OTHER PUBLICATIONS

Dr. Robert Stepleman. "Gauging withdrawals from a retirement portfolio." Sarasota Herald Tribune. Sarasota, Fla.: Feb. 11, 2001. p. D.1. (3 pages).*

(Continued)

*Primary Examiner* — Ojo Oyebisi

(74) *Attorney, Agent, or Firm* — Kilpatrick Townsend & Stockton LLP

(57) ABSTRACT

The invention forecasts a customer's annual withdrawals, manages order of withdrawal, forecasts likelihood that assets at retirement will provide needs for retirement, and provides ability to perform alternative analysis by changing various retirement goals, such as preservation of principal, amount of income desired, or expected length of retirement.

31 Claims, 22 Drawing Sheets

(56) References Cited

U.S. PATENT DOCUMENTS

| | | | | |
|---|---|---|---|---|
| 4,989,141 | A | 1/1991 | Lyons et al. | 364/408 |
| 5,025,138 | A | 6/1991 | Cuervo | 235/379 |
| 5,101,353 | A | 3/1992 | Lupien et al. | 364/408 |
| 5,126,936 | A | 6/1992 | Champion et al. | 364/406 |
| 5,132,899 | A | 7/1992 | Fox | 364/408 |
| 5,148,365 | A | 9/1992 | Dembo | 364/402 |
| 5,220,500 | A | 6/1993 | Baird et al. | 364/408 |
| 5,222,019 | A | 6/1993 | Yoshino et al. | 364/408 |
| 5,227,967 | A | 7/1993 | Bailey | 364/408 |
| 5,237,500 | A | 8/1993 | Perg et al. | 364/408 |
| 5,454,104 | A | 9/1995 | Steidlmayer et al. | 395/600 |
| 5,471,575 | A | 11/1995 | Giansante | 395/144 |
| 5,523,942 | A | 6/1996 | Tyler et al. | 364/401 |
| 5,563,783 | A | 10/1996 | Stolfo et al. | 364/408 |
| 5,590,037 | A | 12/1996 | Ryan et al. | 395/204 |
| 5,592,379 | A | 1/1997 | Finfrock et al. | 395/239 |
| 5,644,727 | A | 7/1997 | Atkins | 395/240 |
| 5,692,233 | A | 11/1997 | Garman | 705/36 |
| 5,784,696 | A | 7/1998 | Melnikoff | 705/36 |
| 5,812,987 | A | 9/1998 | Luskin et al. | 705/36 |
| 5,839,804 | A | 11/1998 | Ho | 312/223.2 |
| 5,864,827 | A | 1/1999 | Wilson | 705/36 |
| 5,864,828 | A | 1/1999 | Atkins | 705/36 |
| 5,875,437 | A | 2/1999 | Atkins | 705/40 |
| 5,884,283 | A | 3/1999 | Manos | 705/30 |
| 5,884,285 | A | 3/1999 | Atkins | 705/36 |
| 5,884,287 | A | 3/1999 | Edesess | 705/36 |
| 5,907,801 | A | 5/1999 | Albert et al. | 455/406 |
| 5,911,135 | A | 6/1999 | Atkins | 705/36 |
| 5,911,136 | A | 6/1999 | Atkins | 705/36 |
| 5,918,217 | A | 6/1999 | Maggioncalda et al. | 705/36 |
| 5,918,218 | A | 6/1999 | Harris et al. | 705/37 |
| 6,012,044 | A | 1/2000 | Maggioncalda et al. | 705/36 |
| 7,016,873 | B1 | 3/2006 | Peterson et al. | 705/36 |
| 2002/0035527 | A1* | 3/2002 | Corrin | 705/35 |

OTHER PUBLICATIONS

Tracey Longo. "The First Cut is the Cheapest: Retirement distributions can come from many sources, IRAs, 401(k)s, and so on. Knowing where to start can prolong earnings growth." Financial Planning. New York: Apr. 1, 1999. p. 1 (4 pages).*

Tracey Longo. "The First Cut is the Cheapest: Retirement distributions can come from many sources, IRAs, 401 (k)s, and so on. Knowing where to start can prolong earnings growth." Financial Planning. New York: Apr. 1, 1999. p. 1).*

Pending U.S. Appl. No. 09/667,017, filed Sep. 20, 2000, entitled System and Method for Protfolio Analysis, inventors Michelle Swenson et al.

Pending U.S. Appl. No. 09/798,110, filed Apr. 1, 2001, entitled System and Method for Forecasting Tax Effects on Financial Transactions, inventors John Foley et al.

Pending U.S. Appl. No. 10/210,410, filed Jul. 31, 2002, entitled Method and System for Integrating Investment Advice With Financial Account Statement Information, inventor Robert Oros.

Pending U.S. Appl. No. 10/698,140, filed Oct. 31, 2003, entitled System and Method for Providing Financial Advice for an Investment Portfolio, inventors James Patterson et al.

Jason Zweig, *12 Deadly Fund Myths- and how to Profit From Them*, Feb. 1996; Money Magazine.

Jason Zweig, *What you can so to stop index funds from blowing up on you when stocks fall*, Sep. 1997, Money Magazine.

Jason Zweig, *How to Beat 77% of Fund Investors Year after Year*; Aug. 1997, Money Magazine.

*Barra Portfolio*, 1998, barra.com.

Laurent Beltity, *Optimism Floue Appliquee au Choix de Portefeuilles*, CCF Recherche & Innovation.

*Financial Planner With Nerves of Silicon*, Oct. 7, 1985, McGraw-Hill Business Week.

Michael Edesess and George A. Hambrecht, *Scenario forecasting: Necessity, not Choice*, The Journal of Portfolio Management.

Thomas Eggenschwiler, and Erich Gamma, *ET++ Swaps Manager: Using Object Technology in the Financial Domain*; Oct. 27, 1992; ACM SIGPlan Notices.

Henry Fesko-Weiss, *Dialing for Profits*, May 1986; Personal Computing.

*Asset Allocation—One Step at a Time*, Mar. 1997, Global Investor. www.Ibbotson.com Apr. 22, 1998, Ibotson Associates.

*Inter Face: Institutional Software + Data*; Ibbotson associates; $2^{nd}$ Quarter, 1998; vol. 5, Issue 2.

*NetResults: Your online financial advisor*, www.isnetwork.com/home/firsttime.html; Mar. 1, 1997.

Fayette Hickox, *Learning about Artificial Intelligence*; Jul. 1986; Institutional Investor.

D. L. Jensen and A.J. King, *Frontier: A Graphical Interface for Portfolio Optimization in a Piecewise Linear-Quadratic Risk Framework*; 1992; IBM Systems Journal.

Jessica Keyes, *Expert Allocator; Tools for Portfolio Optimization*; May 1996, Dension Management Magazine.

Alan J. King, *Asymmetric risk Measures and Tracking Models for Portfolio Optimization Under Certainty*.

Mary Malliaris and Linda Salchenberger; *Beating the Best: A Neural Network Challenges the Black-Scholes Formula*; Mar. 1,1993; IEEE Ninth Conference on Artificial Intelligence for Applications.

Chris Nikolopoulos and Paul Fellrath, *A Hybrid Expert System for Investment Advising*; Jun. 27, 1994; IEEE International Conference on Neural Networks—IEEE World Conference on Computational Intelligence.

K.N. Pantazopoulos, V.S. Verykiosi, E.N. Houstis; *A Knowledge Based System for Evaluation of Option Pricing Algorithms*; Mar. 29, 1998; Proceedings of the IEEE/IAFE/ Informs.

Jacob Paroush, *Risk and Wealth Effects on Efficient Portolio*.

Ivy Schmerken; *Making Risk Analysis Easy as Alpha, Beta*, Jan. 1988, Wall Street Computer Review.

William F. Sharpe, *Asset Allocation; Management Style and Performance Measurement*, Winter 1992, The Journal of Portfolio Management.

Sharpe et al., *Investments: Chapter 8: Portfolio Analysis*; 1995; Prentice Hall, Inc.

*Software (investemtn buyer's guide)*; Wall Street Computer Review, 1990.

Tanaka et al.; *Possibility Portfolio Selection*; Mar. 1995; Proceedings of the 1995 IEEE International Conference on Fuzzy Systems, International Joint Conference on the $4^{th}$.

*Keeping Up With Technology: The 1991 Software Update*; Jun. 1991; trusts and Estates Magazine.

J. Voros; *Portfolio Analysis—An Analytic Demotion of the Efficient Portfolio Frontier; 1986*; European Journal of Operational Research.

* cited by examiner

*FIG. 7*

| Current Performance Planning Report | Prepared for: Susanna Sample |
|---|---|
| | August 5, 2000 |

Data as of August 4, 2000 except where noted below.

| Security | Projected Annual Cash Flow | Approx. Current Yield | Average Annual Total Returns As of latest quarter end (June 30, 2000) | | | | Approx. Current Value | Divid. Re-Invest. |
|---|---|---|---|---|---|---|---|---|
| | | | 1-Year | 5-Year | 10-Year | Since Inception | | |
| American Gen. Pref. | $5,005 | 6.4% | 8.3% | 8.5% | 8.4% | | $78,000 | N |
| Schwab Bond Fund | $4,378 | 6.2% | 6.0% | 6.1% | — | 5.9% (09-1993) | $71,000 | Y |
| *Lehman Agg. Bond Index* | | 5.0% | 2.5% | 7.2% | 6.8% | | | |
| Treasury Bill | $16,700 | 4.8% | 5.4% | 5.4% | 5.4% | | $345,000 | N |
| *Lehman Municipal Bond Index* | | 4.5% | 0.5% | 6.5% | 7.1% | | | |
| IBM | $680 | 1.8% | 82.0% | 28.7% | 27.1% | | $37,150 | N |
| SchwabOne Account | $684 | 1.6% | 1.7% | 26.2% | 30.0% | | $42,000 | Y |
| Chevron | $1,244 | 1.6% | 11.0% | 17.8% | 14.2% | | $78,000 | Y |
| *S&P 500 Index* | | 1.3% | 20.0% | 26.0% | 29.0% | | | |
| Citicorp | $140 | 0.5% | 41.0% | 33.7% | 35.0% | | $25,750 | N |
| Ford Motors | $165 | 0.2% | 21.0% | 23.0% | 25.0% | | $75,000 | Y |

Your total projected annual cash flow may not entirely close the cash flow gap between your income goal and your non-fluctuating sources of cash flow. In this case you may need to rely on capital gains to meet any remaining cash flow gap. This table allows to you assess the approximate current yield and principle total return information in order to determine which holdings are providing you with cash flows versus growth required to meet your lifestyle goals in retirement.

FIG. 8

Current Summary — 601

Prepared for: Susanna Sample
August 5, 2000

602 —

Approximately 65% of your income in retirement will come from non-fluctuating sources of income. These are sources such as rental property, social security and pension payments not invested in securities. The difference between your income goal and your non-fluctuating sources of income will need to be met by your security investments. Your Schwab Investment Specialist can assist you in evaluating your investments and the two sources of income they provide -- dividends and interest generated by your investments and capital gains generated by the sale of a portion of your investments. Your Investment Specialist can also help you determine the best course of action to meet your needs.

603 —

Available Dividend & Interest Cash Flow:

| | |
|---|---|
| Total Cash Flow | $22,525 |
| Currently Re-invested Cash Flow | $ 6,471 |
| Total Available Cash Flow | $28,996 |

Cash Flow Breakdown:

| | |
|---|---|
| Dividend & Interest Sources | $28,996 |
| Non-Fluctuating Sources | $71,004 |
| Total Cash Flow | $100,000 |
| Annual Income Goal | $110,000 |
| Shortfall to be met by Capital Gains | $10,000 |

FIG. 9

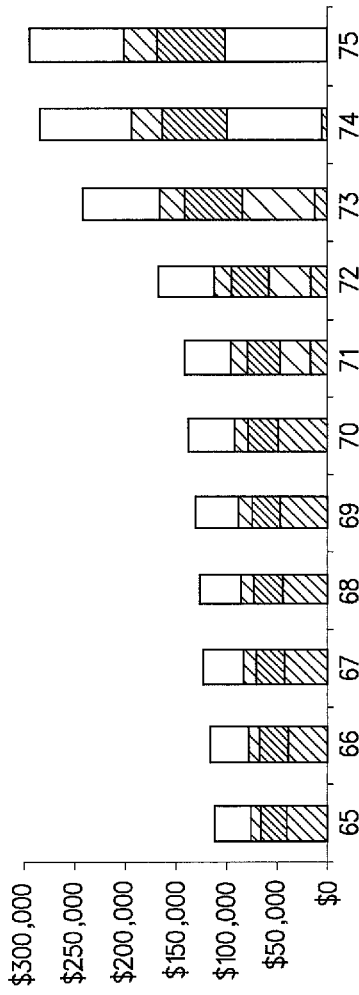

701 — Your In-Retirement Income Projection  
Prepared for: Susanna Sample  
August 5, 2000

To maximize the likelihood of meeting your lifestyle goal in retirement, Schwab recommends that you follow a tax-savvy/smart withdrawal strategy. The table below outlines the income stream withdrawal strategy that may mest meet your goals.

| Income Streams | AGE | 65 | 66 | 67 | 68 | 69 | 70 | 71 | 75 | 80 | 90 |
|---|---|---|---|---|---|---|---|---|---|---|---|
| * Income Goal (inclusive of 4% inflation) | | $110,000 | $114,400 | $118,976 | $123,735 | $128,684 | $133,832 | $139,185 | $162,827 | $241,024 | $293,242 |
| *Investment Income Sources* | | | | | | | | | | | |
| ▫ Taxable Accounts | | $39,000 | $40,560 | $42,182 | $43,870 | $45,624 | $47,449 | $5,852 | $11,010 | $41,870 | $0 |
| ▫ 401K/Trad'l IRA Accounts | | $0 | $0 | $0 | $0 | $0 | $0 | $43,495 | $46,720 | $43,584 | $103,968 |
| ▫ Roth IRA Accounts | | $0 | $0 | $0 | $0 | $0 | $0 | $0 | $0 | $0 | $0 |
| *Non Fluctuating Income Sources* | | | | | | | | | | | |
| ▫ Social Security | | $24,000 | $24,960 | $25,958 | $26,997 | $28,077 | $29,200 | $30,368 | $35,526 | $52,587 | $63,980 |
| ▫ Pension | | $12,000 | $12,480 | $12,979 | $13,498 | $14,038 | $14,600 | $15,184 | $17,763 | $26,293 | $31,990 |
| ▫ Income Property | | $35,000 | $36,400 | $37,856 | $39,370 | $40,945 | $42,583 | $44,286 | $51,809 | $76,689 | $93,304 |

*This withdrawal strategy accesses income from both investment dividends and interest as well as capital gains.

Your Asset Draw Down — 801

Prepared for: Susanna Sample
August 5, 2000

Year End Account Balance — 802

| Age | Taxable | 401K/IRA | Roth | Total Assets |
|---|---|---|---|---|
| 65 | $405,300 | $572,000 | $293,550 | $1,270,850 |
| 66 | $382,977 | $594,880 | $302,357 | $1,280,214 |
| 67 | $357,834 | $618,675 | $311,427 | $1,287,937 |
| 68 | $329,663 | $643,422 | $320,770 | $1,293,855 |
| 69 | $298,240 | $669,159 | $330,935 | $1,297,793 |
| 70 | $263,330 | $695,925 | $340,305 | $1,299,561 |
| 71 | $260,776 | $688,012 | $350,514 | $1,299,302 |
| 72 | $257,672 | $678,147 | $361,029 | $1,296,849 |
| 73 | $254,068 | $666,095 | $371,860 | $1,292,023 |
| 74 | $250,034 | $651,588 | $383,016 | $1,284,637 |
| 75 | $245,670 | $634,318 | $394,507 | $1,274,494 |
| 76 | $241,112 | $613,930 | $406,342 | $1,261,385 |
| 77 | $236,135 | $590,420 | $418,532 | $1,245,088 |
| 78 | $231,320 | $562,965 | $431,088 | $1,225,373 |
| 79 | $226,455 | $531,522 | $444,021 | $1,201,997 |
| 80 | $221,779 | $495,582 | $457,341 | $1,174,703 |
| 81 | $216,959 | $455,195 | $471,062 | $1,143,216 |
| 82 | $212,929 | $409,133 | $485,193 | $1,107,255 |
| 83 | $209,368 | $357,403 | $499,749 | $1,066,520 |
| 84 | $206,662 | $299,294 | $514,742 | $1,020,698 |
| 85 | $205,310 | $233,968 | $530,184 | $969,462 |
| 86 | $205,955 | $160,428 | $546,089 | $912,473 |
| 87 | $208,051 | $78,845 | $562,472 | $849,368 |
| 88 | $212,196 | $0 | $567,687 | $779,884 |
| 89 | $219,155 | $0 | $485,332 | $704,487 |
| 90 | $220,000 | $0 | $370,000 | $590,000 |

Your Estate → $590,000

Investment Asset Draw Down — 203

FIG. 11

RMD Income Streams — 901

Prepared for: Susanna Sample
August 5, 2000

As you reach 70 1/2, you are required by the IRS to begin taking distributions from your IRA. Your required minimum distribution (RMD) is bsed on the total value of your Traditional, Rollover, SIMPLE and SEP-IRAs at the end of the previous year and the calculation method you select.

Based on the value of your tax deferred assets (IRAs and 401K) and your minimum distribution calculation method*, your actual distributions and the IRS mandated minimum distributions from your tax deferred accounts will not vary.

*The single life/recalculation method was used to calculate your required minimum distribution order to achieve your stated goal of minimum taxes in retirement.

902 — Traditional IRA/401K

| Age | IRS Minimum | Actual Withdrawal | Expected Year End Balance |
|---|---|---|---|
| 65 | $0 | $0 | $572,000 |
| 66 | $0 | $0 | $594,880 |
| 67 | $0 | $0 | $618,675 |
| 68 | $0 | $0 | $643,422 |
| 69 | $0 | $0 | $669,159 |
| 70 | $0 | $0 | $695,925 |
| 71 | $34,375 | $34,375 | $688,012 |
| 72 | $35,948 | $35,948 | $678,147 |
| 73 | $37,671 | $37,671 | $666,095 |
| 74 | $39,568 | $39,568 | $651,588 |
| 75 | $41,667 | $41,667 | $634,318 |
| 76 | $44,000 | $44,000 | $613,930 |
| 77 | $46,219 | $46,219 | $590,420 |
| 78 | $49,107 | $49,107 | $562,965 |
| 79 | $51,887 | $51,887 | $531,522 |
| 80 | $55,000 | $55,000 | $495,582 |
| 81 | $57,895 | $57,895 | $455,195 |
| 82 | $61,798 | $61,798 | $409,133 |
| 83 | $65,476 | $65,476 | $357,403 |
| 84 | $69,620 | $69,620 | $299,294 |
| 85 | $74,324 | $74,324 | $233,968 |
| 86 | $79,710 | $79,710 | $160,428 |
| 87 | $84,616 | $84,616 | $78,845 |
| 88 | $78,845 | $78,845 | $0 |
| 89 | $0 | $0 | $0 |
| 90 | $0 | $0 | $0 |

FIG. 12
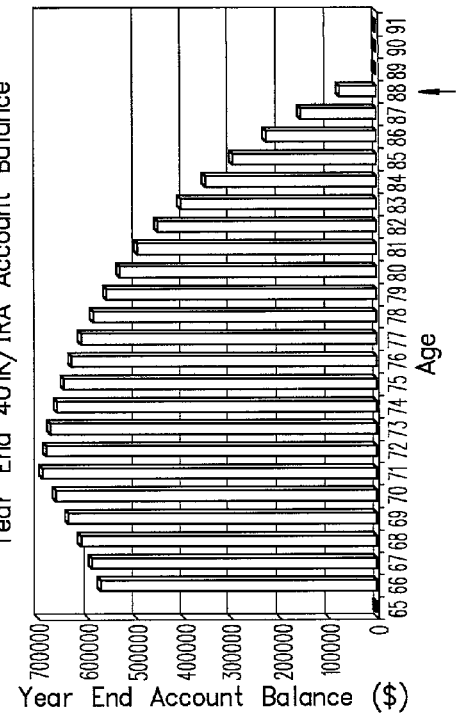
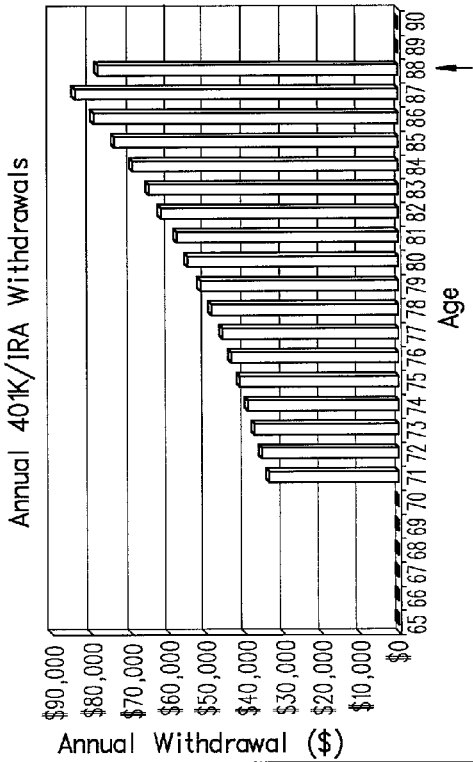

FIG. 13

Summary of Alternatives — 1101

Prepared for: Susanna Sample
August 5, 2000

1102

| | Current Analysis (1103) | Schwab Alternative I (1104) | Schwab Alternative II (1105) |
|---|---|---|---|
| Facts<br>• Income Goal<br>• Estate<br>• Years in Retirement<br>• Asset Allocation<br>• Likelihood of success | $110,000<br>$590,000<br>25 years<br>unchanged<br>75% | $110,000<br>$478,850<br>25 years<br>unchanged<br>95% | $110,000<br>$620,000<br>25 years<br>moderate<br>95% |
| Pros<br>1106 | • met income goal with 75% certainty | • increase probability of meeting in-retirement goals to 95% | • increase probability of meeting in-retirement goals to 95%<br>• increases likely estate left |
| Cons<br>1107 | fall below desired estate goal of $600,000 | • requires the relaxing of one of your goals -- estate | • requires assuming a greater level of risk with your asset allocation and may expose you to a greater degree of volatility in your portfolio's performance |

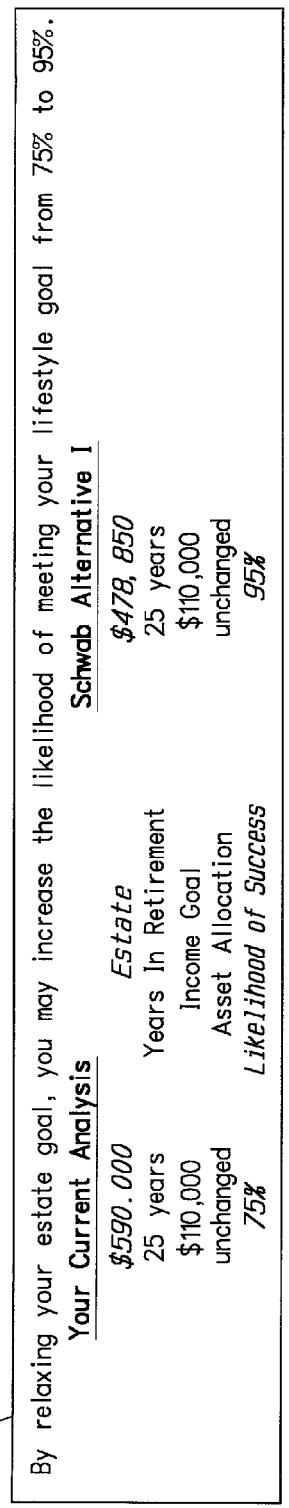
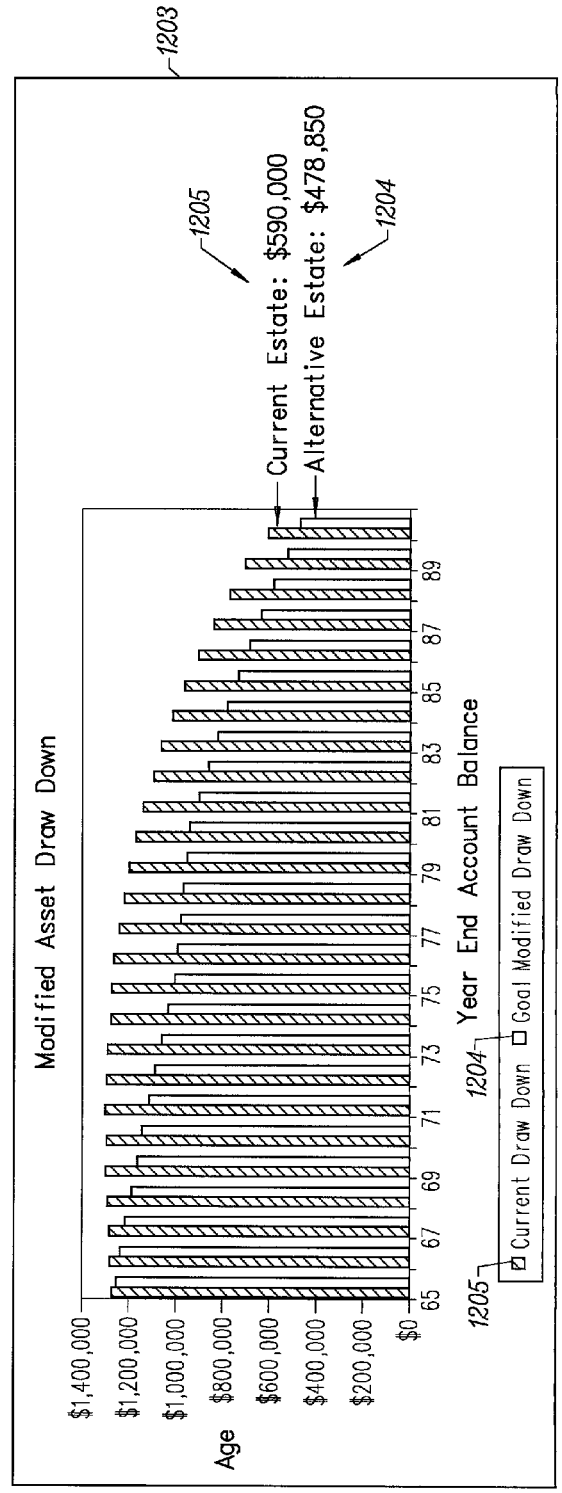
FIG. 14

1401 — Alternative II: Modify Asset Allocation (con't)   Prepared for: Susanna Sample
August 5, 2000

Alternative Analysis II:
Moderate
Average Annual Return (1970-1999)
Best Year: 28.56%   Worst Year: -9.78%

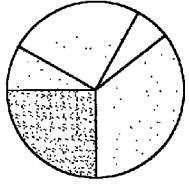

☐ Small Cap  ☐ Large Cap  ☐ International
☐ Fixed Income  ▨ Cash

Current Analysis:
Your Portfolio
Average Annual Return* (1970-1999)
Best Year: XX.XX%   Worst Year: -X.XX%

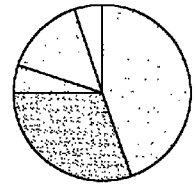

☐ Small Cap  ☐ Large Cap  ☐ International
☐ Fixed Income  ▨ Cash

*Average annual return for a portfolio like yours.

1402

1403 — An alternative to modifying your goals, may be to reallocate your portfolio.

By modifying the way your assets are allocated between asset classes your may be able to better meet your lifestyle goal in retirement.

Our analysis shows that you may be able to better achieve your goals with a more aoptimal asset allocation. Additionally, your preferences indicate that based on your time horizon you may benefit from altering your portfolio diversification to increase your likelihood of achieving your goal in retirement from 75% to 95%.

1404 — Suggested Reallocation:

☐ Underweighted Small Cap        $XX,XXX
☐ Underweighted Large Cap        $YY,YYY
☐ Underweighted International    $ZZ,ZZZ
☐ Overweighted Fixed Income      $AA,AAA
▨ Overweighted Cash              $BB,BBB

Alternative II: Action Plan

Prepared for: Susanna Sample
August 5, 2000

SMALL COMPANY HOLDINGS: OVERWEIGHTED $689,831
Individual Equities

| Amount | % of Asset Class | Company Name (Sector) | I/B/E/S Analyst Consensus Sell ⬜⬜⬜⬜⬜ Strong Buy | S&P Rating | 12 Month Total Return Company | 12 Month Total Return Industry | P/E Company | P/E Industry |
|---|---|---|---|---|---|---|---|---|
| $21,000 | 2% | Aeroflex Inc Electron(Defense) | ⬜⬜⬜⬜■ Strong Buy | (5) (n/a) | -32.9% | -59.2% | 22.0 | 11.5 |
| $47,500 | 5% | Applied Signal Technol... Electron(Defense) | (n/a) | (n/a)(n/a) | 49.2% | -59.2% | 12.3 | 11.5 |
| $8,625 | 1% | Atlantic Pharmaceutica... Hlth Care(Drugs-Maj) | (n/a) | (n/a)(n/a) | 82.2% | -11.4% | --- | 37.3 |
| $19,500 | 2% | Auto Immune Inc. Biotechnology | (n/a) | (n/a)(n/a) | -40.5% | 94.7% | --- | 63.1 |
| $15,813 | 2% | Biomira Inc. | (n/a) | (n/a)(n/a) | 133.6% | 94.7% | --- | 63.1 |
| $202,496 | 21% | Terayon Communications... Communications Equip. | ⬜⬜■⬜⬜ | (8) (n/a) | 164.2% | 65.2% | --- | 85.9 |
| $0 | <1% | Terex Corp. Machinery(Diver) | ⬜⬜⬜■⬜ | (10) (n/a) | -7.6% | 12.3% | 5.3 | 22.1 |
| $5,344 | 1% | United Parcel 'B' Air Freight | ⬜⬜■⬜⬜ | (15) * * | n/a | -3.1% | --- | 18.6 |
| $141,375 | 15% | Wind River Systems Computer(Sftwr&Sv) | ⬜⬜⬜⬜⬜ | (5) (n/a) | 34.9% | 26.3% | 54.9 | 69.0 |

17.7%

Benchmark: RUSSELL 2000

Buy/Sell _____
Buy/Sell _____
Buy/Sell _____

Symbols
[T] This security is held in a tax-deferred account 1501
1502

FIG. 18

*Alternative II: Action Plan (con't)*

Prepared for: Susanna Sample
August 5, 2000

LARGE COMPANY HOLDINGS: OVERWEIGHTED $258,552
Individual Equities

| Amount | % of Asset Class | Company Name (Sector) | I/B/E/S Analyst Consensus | S&P Rating | 12 Month Total Return Company | 12 Month Total Return Industry | P/E Company | P/E Industry |
|---|---|---|---|---|---|---|---|---|
| $68,813 | 9% | Fifth Third Bancorp Banks(Mj Regional) | Sell □■□□ Strong Buy | (22) ★★★ | -1.7% | -15.1% | 30.9 | 15.7 |
| $51,375 | 7% | Int'l Bus. Machines Computers(Hardware) | □■□□ | (33) ★★★★★★ | 23.1% | 19.0% | 27.3 | 39.7 |
| $6,800 | 1% | Lucent Technologies Communications Equip | □■□□ | (42) ★★★★★★ | -1.2% | 65.2% | 81.6 | 85.9 |
| $23,344 | 3% | MCI WorldCom Telecomm(Lng Dist) | □■□□ | (34) ★★★★★★ | -13.2% | -2.2% | 32.4 | 33.6 |
| $9,413 | 1% | Novell Inc. Computer(Sftwr&Sv) | □■□□ | (10) ★★★★ | 63.8% | 26.3% | 60.7 | 69.0 |
| $16,325 | 2% | Oracle Corp Computer(Sftwr&Sv) | □■□□ | (35) ★★★★★ | 171.0% | 26.3% | 106.3 | 69.0 |
| $215,500 | 29% | Procter & Gamble Hsehold Prod(NonDur) | □■□□ | (22) ★★★★★ | 12.6% | 13.2% | 39.0 | 34.0 |
| $15,900 | 2% | Schwab(Charles)Corp Investment Bk/Brkg | □■□□ | (14) ★★★★ | 2.9% | 8.8% | 51.2 | 19.2 |
| $7,150 | 1% | Solectron Corp Electrical Equip | Sell □■□□ Strong Buy | (26) ★★★★★★ | 63.1% | 26.1% | 59.0 | 38.3 |
| $14,550 | 2% | Tyco International Mfg(Diver) | □■□□ | (19) ★★★★★★ | 11.9% | 15.1% | 55.9 | 25.0 |
| $11,600 | 2% | Global Crossing Ltd. Telecomm(Lng Dist) | □■□□ | (9) ★★★★ | 92.2% | -2.2% | 112.8 | 33.6 |
|  |  |  |  |  | 10.4% |  |  |  |

Benchmark: SP500

Buy/Sell
Buy/Sell
Buy/Sell
Symbols

[TD] This security is held in a tax-deferred account

Alternative II: Action Plan (con't)

Prepared for: Susanna Sample
August 5, 2000

1701

1702

INTERNATIONAL HOLDINGS: UNDERWEIGHTED $331,446
Individual Equities

| Amount | % of Asset Class | Company Name (Sector) | I/B/E/S Analyst Consensus | S&P Rating | 12 Month Total Return Company | Industry | P/E Company | Industry |
|---|---|---|---|---|---|---|---|---|
| $10,500 | 100% | Fletcher Challenge For... Paper&Forest Prod | Sell ☐☐☐☐■ Strong | (2) (n/a) | −28.8% | 18.7% | 2.5 | 28.6 |

Benchmark: MSCI EAFE ND    19.3%

Buy/Sell
Buy/Sell
Buy/Sell

Symbols
[TD] This security is held in a tax-deferred account

*FIG. 19*

Alternative II: Action Plan (con't)

Prepared for: Susanna Sample
August 5, 2000

1901 —

FIXED INCOME HOLDINGS: UNDERWEIGHTED $205,167

1902 —

Buy/Sell
Buy/Sell
Buy/Sell

Symbols
[C] This security represents a Core investment (Index Fund)
[TD] This security is held in a tax-deferred account

FIG. 20

SYSTEM AND METHOD FOR INCOME PLANNER

CROSS-REFERENCE TO RELATED APPLICATIONS

This application claims priority to U.S. Ser. No. 60/286,770 filed Apr. 26, 2001.

BACKGROUND OF THE INVENTION

1. Technical Field

The invention relates to retirement income planners. More particularly, the invention relates to forecasting a customer's income, managing order of withdrawal, forecasting a likelihood that assets at retirement will provide needs for retirement, and providing ability to perform alternative analysis by changing various retirement goals in retirement.

2. Description of the Prior Art

In the past, retirement was defined as the period following an individual's withdrawal from the labor force. Today, however, most people vary their attachment to the labor force throughout their lives, so retirement may be thought of differently, for example, in terms of an Accumulation Phase and a Drawing-Down Phase. The Accumulation Phase is the period during which individuals accumulate financial assets. The Drawing-Down Phase is the period during which individuals start using their financial assets to meet their income needs. Most Web and traditional financial advisory products and services are aimed at people in the Accumulation Phase. Despite the fact that people in the Drawing-Down Phase are currently among the most wealthy in America, most financial institutions fail to provide a broad range of services dedicated to these individuals and their on-going income (cash flow) management needs.

As individuals approach or enter retirement their investment objectives shift away from accumulation/growth and move toward income generation. Individuals seek to replace the paycheck they used to receive from their employer. During this phase an individual will generally draw income from multiple sources: part-time employment; company pensions; social security benefits; annuities; investments, and the like.

In order to begin to manage their income needs during the Drawing-Down Phase, individuals need to identify and evaluate their existing and potential sources of income. A very important potential source of funds for this group will be investment income. Therefore, identifying the timing and amount of income being currently generated by their investments and evaluating individual investments based on income in addition to traditional risk and return measures is needed in order for this group to manage effectively their overall income needs.

There is very little in the way of education and advice-type products in the market today that help individuals evaluate their investments based on their overall income needs.

Except for the assistance of a personal financial planner, very little advice and information addressing this shift to income and retirement risk management exists in the market place.

Prior art is geared toward providing customers with tools for planning for retirement, as opposed to in-retirement. Much of the prior art focuses on how to get growth in a portfolio.

One prior art reference is T. Rowe Price Associates, Retirement Income Manager$^{SM}$ Analysis and Recommendation, prepared Jan. 10, 2000, provides specific advice regarding improving the user's probability of success in meeting their in-retirement goals. T. Rowe price uses simulation techniques to identify a retirement income strategy that they believe is best for the client based on the amount of retirement assets the client has and the client's personal goals. The output includes four different retirement income strategies: a recommended strategy, two alternative strategies, and the strategy that is most likely to meet the client's monthly income goal. Each strategy includes a recommended pre-tax monthly income, an estimate of the probability that the withdrawal amount can be sustained throughout retirement, a product allocation (% in variable annuities and % in mutual funds), an asset allocation for mutual funds, and an asset allocation for variable annuities. They also provide an implementation plan that includes recommendations of specific T. Rowe Price investment products and specific guidance on the amounts to withdraw over time from each account type.

Following are key assumptions made by T. Rowe's model.
  The client's current portfolio is converted to cash. All taxes and transactions costs are completely ignored in this conversion process;
  Cash is invested in one of 13 model asset allocation portfolios;
  Asset classes included in these model portfolios are:
    U.S. large-cap;
    U.S. small-cap;
    Investment-grade bonds;
    High-yield bonds;
    Money market securities;
    Foreign stocks; and
    Foreign bonds.
  It should be appreciated that that there is no allocation to municipal bonds because, it appears that tax efficiency is not a goal of the product.
  Asset allocation becomes more conservative over time;
  Assets are drawn down first from taxable accounts, then tax deferred assets. Roth IRAs are left for last in all analyses;
  Beginning at age 70 and one half, minimum required distributions are included in the client's income strategy. When the minimum required distribution exceeds the draw-down amount, the excess is placed in the client's taxable account;
  The projected withdrawal amounts are pre-tax, i.e. there is no attempt to adjust for the taxes a client will owe due to the withdrawal;
  Each year, an estimated tax on the appreciation or depreciation of the assets in the client's taxable account is calculated. T. Rowe determines the tax rates (capital gains and ordinary income) used in this calculation and it is not the rate inputted by the client. The return on money market and bond funds is completely taxed at ordinary income rate. The return on stock mutual fund assets is taxed at 60% of the ordinary income tax rate; and
  Returns on key asset classes are normally distributed; T. Rowe determines the future average return on each asset class (according to T. Rowe, they use rates lower than historical rates to be conservative); the historical standard deviations of returns on each asset class and the correlations among asset classes are set at their historical levels. T. Rowe cautions clients that their estimates of probability are probably too high because actual stock return distributions have a higher concentration of returns in the tails of the distribution than is implied by normality.

Methodology

1. Simulate 500 future paths for asset class returns.
2. Create investment mixes: a mix consists of a product allocation (mutual funds and variable annuities) and an asset allocation. There are 7 different product allocations and 13 different asset allocations.

3. For each investment mix, define many different levels of monthly withdrawals. A combination of an investment mix and a withdrawal amount is labeled a "retirement income strategy".

4. Subject each retirement income strategy to the 500 investment-return scenarios and calculate the probability that a given level of income can be sustained throughout retirement.

5. The recommended strategy is the retirement income strategy that offers the highest utility, where utility is based on a model of the client's preferences. This model is essentially a scoring system applied to a series of questions regarding the client's financial goals. Alternative strategies include the next highest utility strategy and the strategy that is compatible with the client's risk tolerance that provides the highest level of monthly income. Only strategies resulting in a 70% probability or higher of being able to sustain the withdrawal amount throughout retirement are recommended. The strategy that is most likely to hit the client's monthly income target is also included.

6. Both a retirement counselor and a financial planner review the clients recommended income strategy to make sure the recommendation is consistent with the client's personal profile.

Key Methodological Weaknesses

Simulations do not include assets from the client's current portfolio but assumes client liquidates all their securities to bring to T. Rowe.

Tax treatment: with the exception of an adjustment to taxable account balances, taxes are ignored throughout the product. The client's own tax rate plays no role in the simulations.

Simulations are at the asset class level using indices returns, (i.e. S&P 500 index) to simulate asset class returns. Simulations on T. Rowe Price recommend funds are not performed. However, all recommendations come in the form of T. Rowe Price propreitary funds.

Normality assumption: probability estimates will be too high because stock return distributions have more observations in the tails of the distributions than is implied by normality.

One "Optimal" withdrawal sequence is forced on all T. Rowe Price solutions—the withdrawal sequence recommendation is not customized.

No "what-if" type analysis for years in retirement.

Does not consider contributions between today and retirement date if retirement date is in the future. The best way for some users to achieve their goals will be to delay retirement or increase their investment amount between now and retirement.

It would be advantageous to provide a system and method that examine actual holdings and actual positions.

It would be advantageous to provide a system and method that provides a customized optimal withdrawal sequencing recommendation.

It would be advantageous to provide a system and method that provides a depletion to a goal service to a high value of customers.

It would be advantageous to provide a system and method that focuses on balancing growth and yield, and identifies assets which are providing low yields and low growth rates, as well as providing customers with information which will allow them to make decisions that fit their cash flow needs.

It would be advantageous to provide a system and method for financial institutions to deliver effectively investment help and advice across its multiple channels to meet customers' full-service investing needs for the near and in-retirement group of customers.

SUMMARY OF THE INVENTION

This invention provides the customer with information that allows the customer to make decisions that fit their cash flow needs. The invention forecasts the customer's likelihood of meeting their in-retirement goal based on the actual assets and securities a customer holds at the financial institution and any assets and securities they holds at other institutions. The invention also manages the order of withdrawal from taxable, tax-deferred and tax free accounts so that the customer defined in-retirement goal is met in an efficient way. For example, if the customer identifies maximizing their estate, as their priority goal, the invention may recommend that those assets in tax-free accounts are withdrawn last while assets in taxable accounts are withdrawn first. The recommended sequence will vary depending on a variety of client-specific factors as well as how the customer prioritizes their in-retirement goals. The invention also forecasts a likelihood that assets at retirement will provide for needs throughout retirement. The invention also provides the ability to perform alternative analysis by reprioritizing various retirement goals, such as preservation of principal, portfolio allocation, amount of income desired or expected length of retirement. The invention also allows for company representatives to output information in a manner that is uniform and consistent across the company. That is, the invention is designed to integrate with other existing or future financial applications of the financial institution, as well as developed on a common system architecture for both World Wide Web (Web) and applications that reside on the desktop computer of the financial institution's retail branch representatives located nationwide (retail desktop computers) and phone service representatives.

BRIEF DESCRIPTION OF THE DRAWINGS

FIG. 7 is an example of a customer's current performance planning report according to the invention;

FIG. 8 is an example of a customer's current summary corresponding according to the invention;

FIG. 9 is an example of a customer's in-retirement income projection report according to the invention;

FIG. 11 corresponds to the RMD income streams according to the invention;

FIG. 12 corresponds to the RMD income streams according to the invention;

FIG. 13 is an example of summary of alternatives report according to the invention;

FIG. 14 is an example of the non-financial alternative according to the invention;

FIG. 16 is an example of the financial alternative according to the invention;

FIG. 17 is an example of the action plan corresponding to the Alternative II according to the invention;

FIG. 18 is an example of the action plan corresponding to the Alternative II according to the invention;

FIG. 19 is an example of the action plan corresponding to the Alternative II according to the invention;

FIG. 20 is an example of the action plan corresponding to the Alternative II according to the invention.

DETAILED DESCRIPTION OF THE INVENTION

The invention analyzes a customer's assets, focuses on balancing growth and yield, and identifies assets that are providing low yields and low growth rates. The invention provides the customer with information that allows the customer to make decisions that fit their cash flow needs. The invention also forecasts the customer's likelihood of meeting their in-retirement goal based on the actual assets and securities a customer holds at the financial institution and any assets and securities they hold at other institutions. The invention also manages the order of withdrawal from taxable, tax-deferred and tax-free accounts so that the customer defined in-retirement goal is met in an efficient way. For example, if the customer identifies maximizing their estate, as their priority goal, the invention may recommend that those assets in tax-free accounts are withdrawn last while assets in taxable accounts are withdrawn first. The recommended sequence will vary depending on a variety of client-specific factors as well as how the customer prioritizes their in-retirement goals. The invention also forecasts a likelihood that assets at retirement will provide for needs throughout retirement. The invention also provides the ability to perform alternative analysis by reprioritizing various retirement goals, such as preservation of principal, portfolio allocation, amount of income desired or expected length of retirement. The invention also allows for company representatives to output information in a manner that is uniform and consistent across the company. That is, the invention is designed to integrate with other existing or future financial applications of the financial institution, as well as developed on a common system architecture for World Wide Web (Web), retail desktop computers, and phone service center desktop computers.

An objective of the preferred embodiment of the invention is to help customers create a personalized cash flow withdrawal plan by analyzing their existing assets and using a variety of investment products, and to provide more in depth and specific investment advice, taking into account a host of complicating factors, such as, for example, tax implications, preserving wealth as drawn down on principal, cash flow timing, and the like. The invention discussed herein can be used by a financial institution's branch and phone representatives for advising customers in the institution's branch offices and over the phone and can be used directly by customers through the institution's online customer center. The target market of the preferred embodiment of the invention is customers with more than $100,000 in invested assets held at the financial institution or high potential prospected investors.

One Architecture

Figure 1:
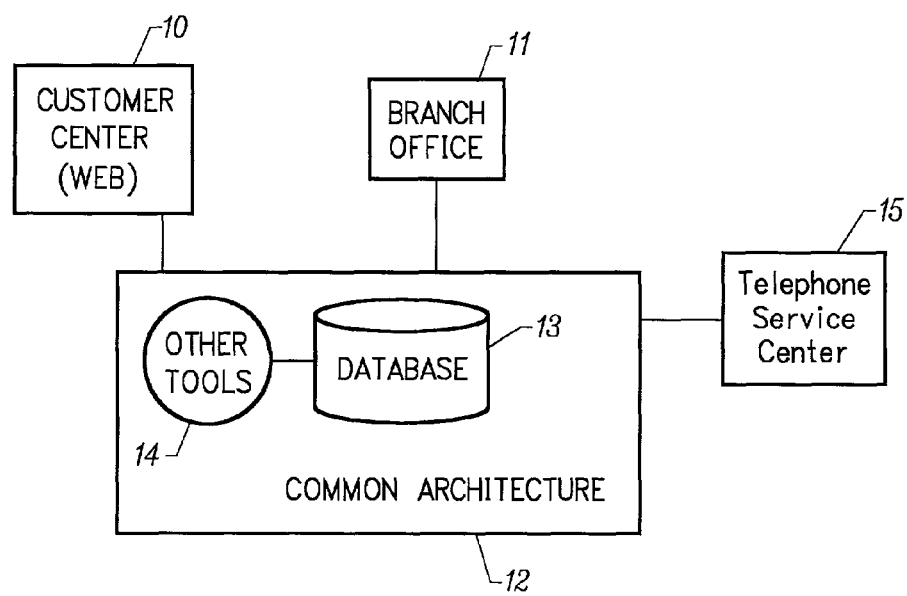
FIG. 1 is a schematic diagram showing common architecture according to the invention.

The preferred embodiment of the invention provides for customer interaction by three different channels and is discussed with reference to FIG. 1. FIG. 1 is a schematic diagram showing the common architecture according to the invention. By the first channel, customers access the information online through a customer center 10 and are able to use it independently. By the second channel, the customer and a branch representative from the financial institution use the invention together in a branch office 11. Likewise by the third channel, the customer and a phone representative from the financial institution discuss the invention output together over the phone 15. While the underlying income planning functionality and business logic is identical, user interfaces and some features of the invention may differ to accommodate different delivery mechanisms, such as, for example self-service versus assisted service.

The preferred embodiment of the invention is built on a common system architecture 12 for both the Web and retail desktop computers. The system architecture provides a common customer database 13 for all channels as well as all future tools 14 for linking and sharing information.

In the preferred embodiment of the invention, a customer can use any or all three channels for income planning. For example, a customer is able to follow up on a branch office or phone conversation by using an online version for updating and reviewing the customer's income generating portfolio. Likewise, a customer is able to follow up on a customer center session with branch office or phone conversations.

Integrate into Suite

The preferred embodiment of the invention integrates robustly into a suite of planning tools that provide financial guidance and advice to the near and in-retirement groups making key life-event decisions. The in-retirement income planner discussed herein fills a large void in the current marketplace as well as enhances a financial institution's advice offering at the retail branch and phone center level as well as the customer center level.

Figure 2:
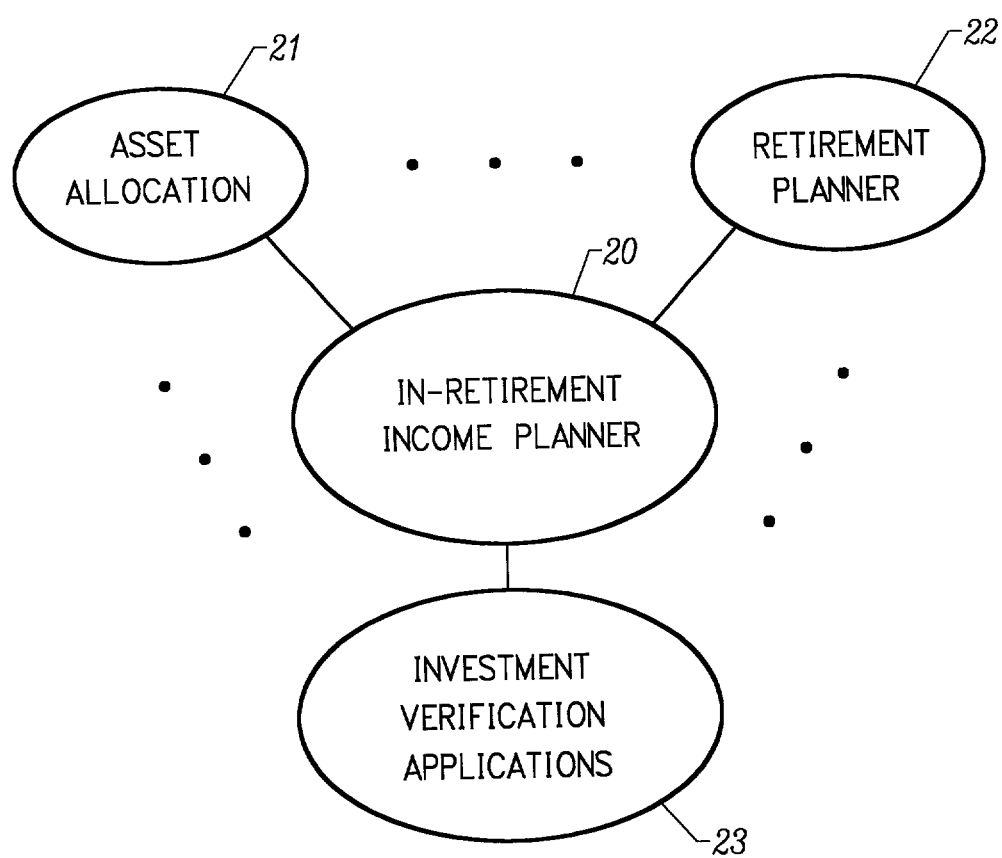
FIG. 2 shows an in-retirement income planner integrating with other tools according to the invention.

FIG. 2 shows the in-retirement income planner 20 integrating with other tools, within a computer, according to the invention. It builds on and draws from other computer tools and applications, such as, for example, asset allocation 21, retirement planner 22, and investment verification applications 23 by downloading a customer's position level data to the computer.

The preferred embodiment of the invention is flexible and modular so that additional functionality can be added, and to allow for increases in significant volume of customers.

The preferred embodiment of the invention should be consistent in "look and feel" to other applications in the suite of applications discussed above.

Business Objectives

The preferred embodiment of the invention can be used by a financial institution to accomplish the following business objectives. The invention:

Enhances a suite of advisory tools available to branch representatives and helps them in building relationships with customers and addressing their needs;

Enhances advice, such as planning and guidance, offering in a customer center;

Promotes customer good-will by providing needed education and advice in the area of income planning to customers;

Encourages customers to re-evaluate their holdings and to examine additional investment products;

Increases the visibility and highlights the benefits of fixed income products as well as annuities; and Highlights importance of considering growth and income investment strategies for retirees.

High Level Flow

Figure 3:
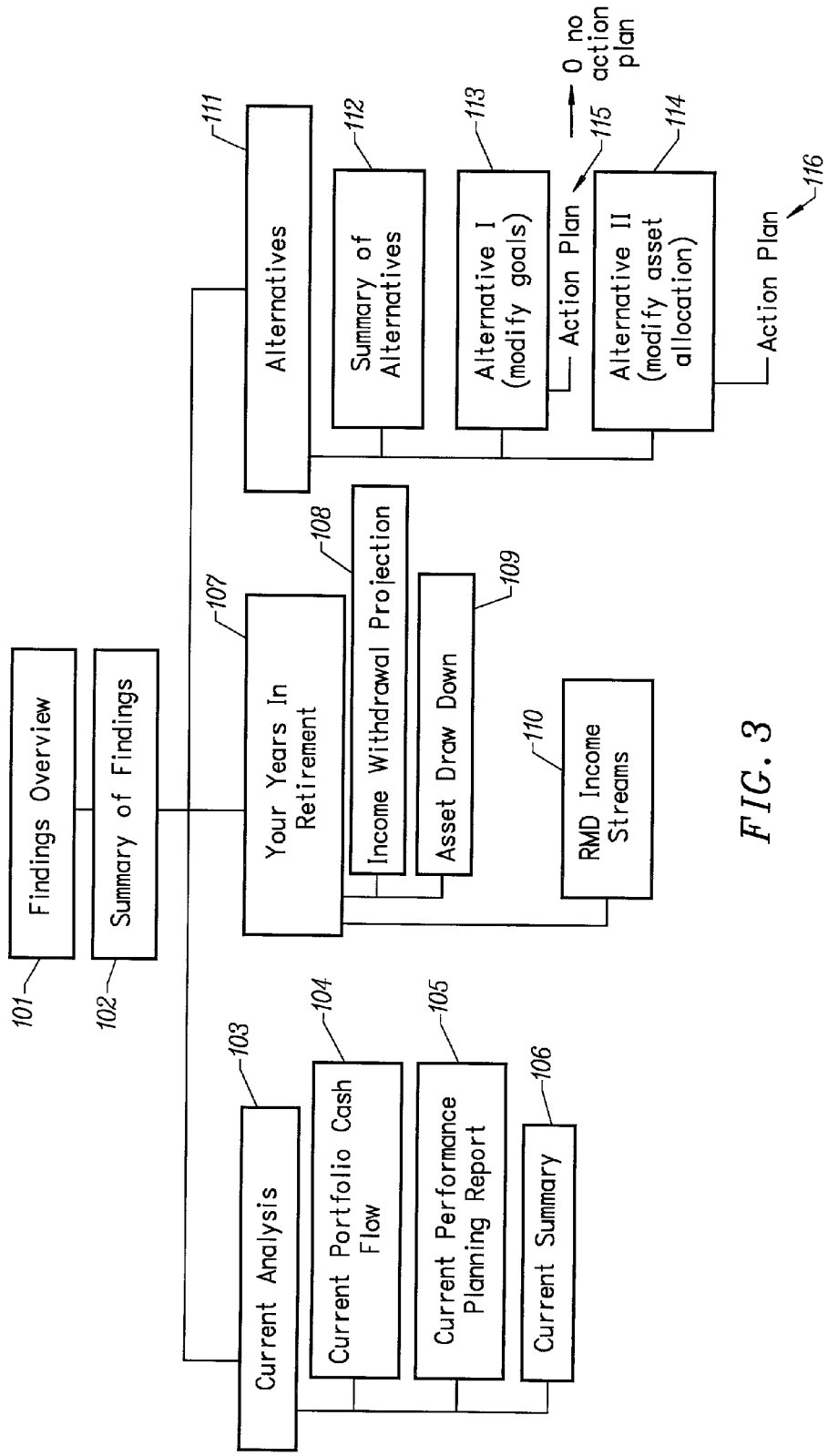
FIG. 3 shows a high level schematic diagram for providing an in-retirement customer with information according to the invention.

A preferred embodiment of the invention is described with reference to FIG. 3. FIG. 3 shows a high level schematic diagram for providing an in-retirement customer with information, comprising an action plan, given the customer's current financial information and in-retirement goals. The invention gives the customer a snapshot of how much income the customer's current portfolio is generating, compares that income to the customer's income goal, and directs the customer in narrowing any gap that may exist between the goal and the customer's current income status. Further detail of each of the components in the high level flow is provided in a separate section herein below.

Referring to FIG. 3, the invention provides a findings overview 101 based on the customer's stated income, estate value, and number of years in retirement goals, as well as the customer's portfolio allocation. A summary of findings 102 is then provided.

Next a detailed current analysis of the customer's current portfolio is performed 103. Performing current analysis 103 comprises: providing the customer's current portfolio cash flow 104, where the customer's estimated annual cash flow and estimated cash flow gap, if one exists, are shown; current performance planning report, where the approximate current yield and total return information are shown; and current summary, where the difference between the customer's income goal and non-fluctuating sources of income is shown.

Next, an analysis of the customer's years in retirement is shown 107. The analysis comprises performing and showing a customer's in-retirement income withdrawal projection 108, where the in-retirement income withdrawal projected incorporates a withdrawal sequencing strategy that best meets the customer's goals; where assets are listed by taxable and non-taxable categories, investment asset draw down 109; and required minimum distribution (RMD) streams 110 are shown. Note: Income projection may include income from capital gains and/or principal.

Next, strategy alternatives are analyzed and shown 111 comprising performing and showing a summary of alternatives 112, where customer information, and pros and cons of two alternatives are shown. Note that FIG. 3 shows one example of many possible alternative recommendations that may result. The alternatives may include but are not limited to the first alternative 113, where the customer's estate goal is relaxed; and the second alternative 114, where the customer's asset allocation is altered. Action plans for the second alternative is then provided 116.

It should be appreciated that the components, current analysis 103, years in retirement 107, and alternatives, could be used separately and individually if given the appropriate input.

Detailed Flow

Further details of each of the components in the high level flow of the preferred embodiment of the invention are described herein below using figures.

Figure 4:
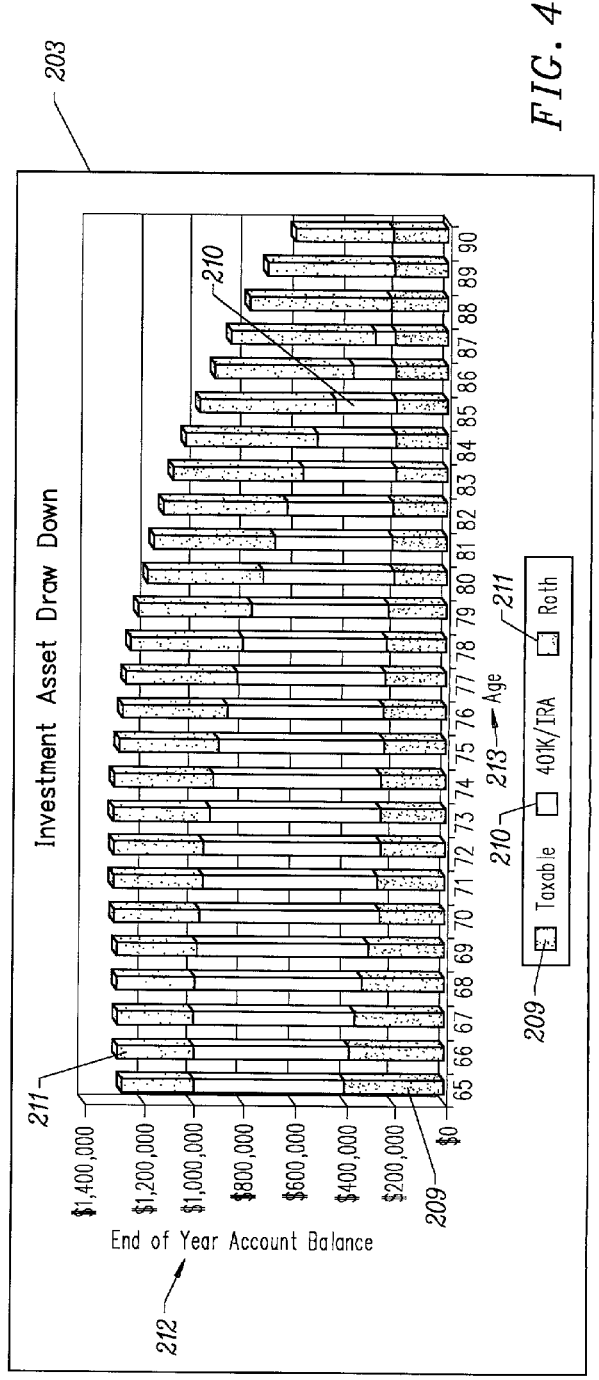
FIG. 4 is an example of a customer's findings overview report corresponding to the results of the findings overview according to the invention.

The preferred embodiment of the invention provides a findings overview report, as depicted in FIG. 4. FIG. 4 is an example of a customer's findings overview report corresponding to the results of the findings overview of FIG. 3 101. The findings overview report comprises a heading 201, a table 202, and a chart 203, according to the invention. The heading comprises the title of the report, the name of the customer, and the date.

The table in FIG. 4 shows the customer's in-retirement income goal 204, the customer's in-retirement estate goal 205, how many years the customer expects to be in retirement 206, the status of the customer's asset allocation 207. The likelihood of success 208 that the customer would meet their defined priority in-retirement goal while all the other goals are held constant is also shown. The priority goal default is set at "meeting the client's estate goal" unless otherwise indicated by the client.

The chart in FIG. 4 shows an example of the customer's asset draw down schedule according to the invention. That is, the bar chart shows the amounts each of taxable (bottom) 209, tax deferred (middle) 210, and tax free (top) 211 withdrawals for the customer's end of year account balance 212 versus the customer's in-retirement age 213.

Figure 5:
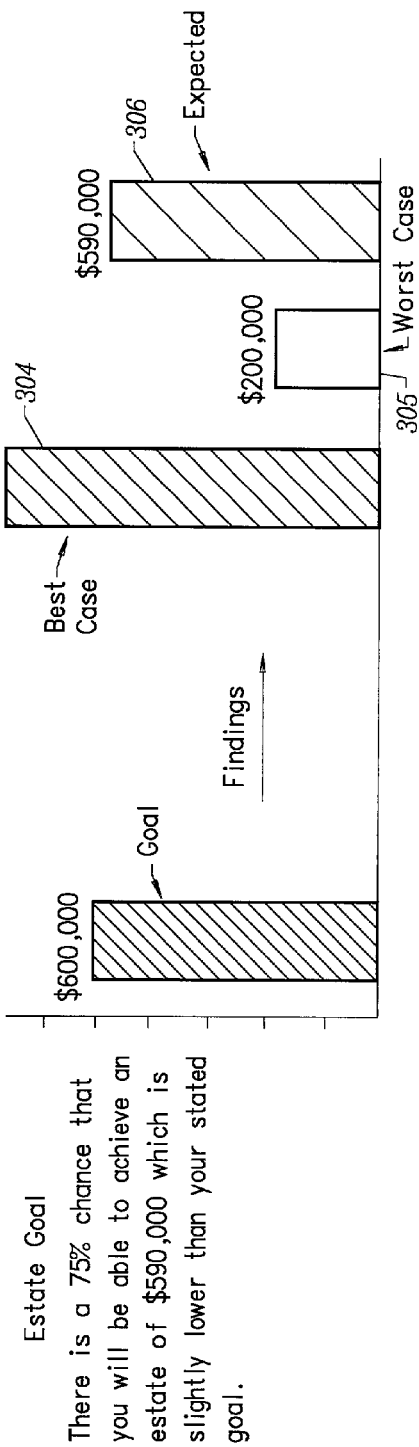
FIG. 5 is an example of a customer's summary of findings report corresponding to the summary of findings according to the invention.

The preferred embodiment of the invention provides a customer's summary of findings report, as depicted in FIG. 5. FIG. 5 is an example of a customer's summary of findings report corresponding to the summary of findings of FIG. 3 102. The summary of findings report comprises a heading 301, a summary 302, a chart 303, according to the invention. The summary of findings report shows the customer the likelihood that the customer will meet the desired estate goal, given the customer's in-retirement income needs, years in retirement goal and current portfolio allocation. The summary 302 restates the input into the analysis and the outcome which is the likelihood of the customer meeting a lifestyle goal in retirement. The chart 303 shows the likelihood for meeting the estate goal, as well as the best case 304, the worst case 305, and the expected case 306 results.

Figure 6A:
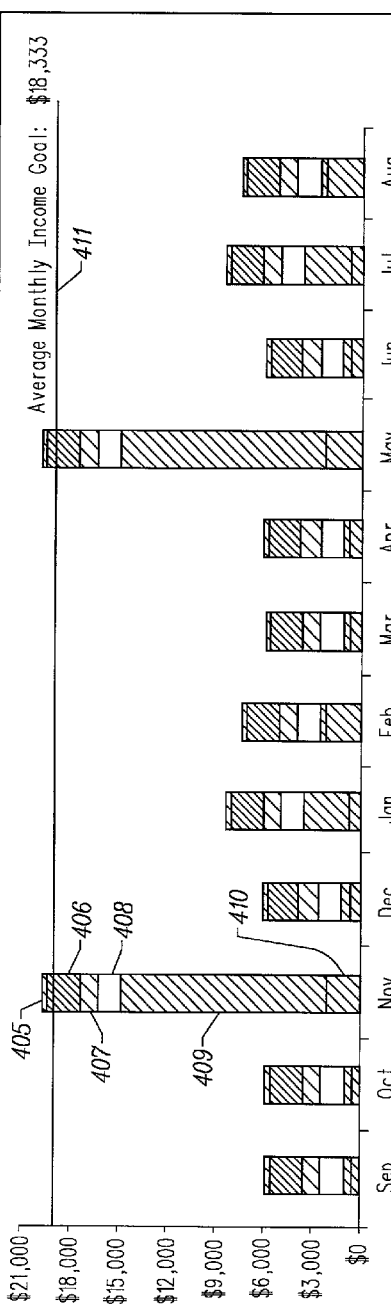
FIG. 6 is an example of a customer's current portfolio cash flow report corresponding to the current portfolio cash flow according to the invention.
Figure 6B:
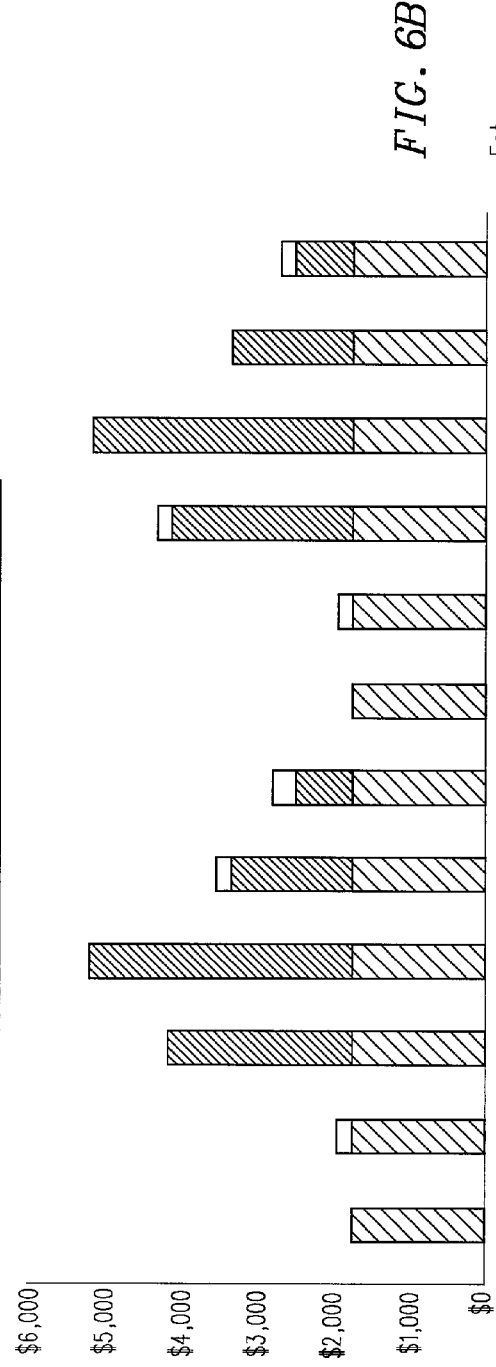

The preferred embodiment of the invention provides a current portfolio estimated annual cash flow report, as depicted in FIG. 6a, which shows a 12-month rolling cash flow estimate. An alternative method to depict current portfolio estimated annual cash flow report, FIG. 6b shows a 12-month historic rolling estimate. FIG. 6a and 6b is an example of a customer's current portfolio cash flow report corresponding to the current portfolio cash flow of FIG. 3 104. The current portfolio cash flow report comprises a heading 401, a summary spotlighting the customer's estimated annual cash flow gap (surplus) 402, a bar chart 403, and a table 404 corresponding to the bar chart 403. The estimated annual cash flow bar chart shows the cash flows for a full year, wherein the cash flows are broken down to sources of income. The full year cash flows may be displayed either as a 12 month rolling (FIG. 6a) or a 12 month historic (FIG. 6b) view. In this example, the dividend and interest sources of cash flow are: equity dividend 405, fixed income 406, and cash 407; the non-fluctuating sources of income are: income property 408, social security 409, and pension plans 410. Also shown running across the bar chart is a line at the level of the customer's desired average monthly in-retirement income goal 411 to help the customer in understanding the cash flow estimate. The cash flow table 404 shows the dollar amount for each month for each source.

The preferred embodiment of the invention provides a current performance planning report, as depicted in FIG. 7. FIG. 7 is an example of a customer's current performance planning report corresponding to the current performance planning report of FIG. 3 105. The current performance planning report comprises a heading 501, a table 502 showing approximate current yield and total return information to help the customer assess their holdings on an income versus growth continuum. Industry indices, such as the Lehman Municipal Bond Index 503 and the S&P 500 Index 504 are benchmarks. Indexes are unmanaged, do not incur management fees, costs and expenses and cannot be invested in directly. The report provides an explanation of the purpose of the table at the bottom of the page 505.

Based on this report, the customer can assess, at a high level, growth versus cash flow balance of the portfolio by examining current yield and total return information for each of the holdings. The report lists individual holdings by current yield to give the customer a perspective on various assets are projected to contribute to the cash flow goal. The report also provides 1-year, 5-year, and 10-year total return information for the financial investments.

The preferred embodiment of the invention provides a current summary report, as depicted in FIG. 8. FIG. 8 is an example of a customer's current summary corresponding to the current summary of FIG. 3 106. The current summary report comprises a heading 601, a section providing an evaluation of the customer's investments, whereby a specialist can assist the customer, and a table 603 showing the customer's estimated annual cash flow breakdown of dividend and interest sourses and non-fluctuating sources, compared with the customer's annual goal, and thereby the customer's estimated annual shortfall (surplus) to be met by capital gains.

The preferred embodiment of the invention provides a customer in-retirement income withdrawal projection report, as depicted in FIG. 9. FIG. 9 is an example of a customer's in-retirement income withdrawal projection report corresponding to the in-retirement income withdrawal projection of FIG. 3 108. The in-retirement income withdrawal projection report comprises a heading 701, a bar chart 702 and a corresponding table 703 showing a recommended income stream withdrawal strategy for best meeting the customer's goals. It should be noted that any applicable distribution or income planning forecasting model may be used. The preferred embodiment uses a tax-savvy or tax-smart withdrawal strategy which maximizes the estate.

Figure 10:
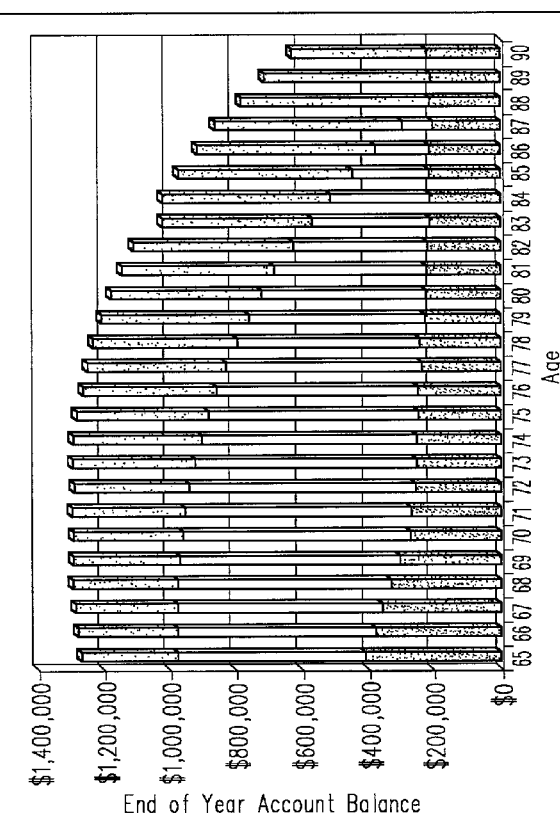
FIG. 10 is an example of a customer's asset draw down report according to the invention.

The preferred embodiment of the invention provides a customer asset draw down report, as depicted in FIG. 10. FIG. 10 is an example of a customer's asset draw down report corresponding to the asset draw down of FIG. 3 109. The asset draw down report comprises a heading 801, the same asset draw down bar chart of FIG. 4 203 and a corresponding table 802 listing the customer's age, and the dollar amount of withdrawals for each category, and the final projected estate value.

The preferred embodiment of the invention provides a customer required minimum distribution (RMD) chart and explanation report, as depicted in FIG. 11. FIG. 11 corresponds to the RMD income streams of FIG. 3 110. The RMD chart and explanation of FIG. 11 comprises a heading 901 and the chart and explanation 902. Currently, the IRS requires individuals who reach the age of 70 and one-half years to begin taking distributions from his or her IRA or 401K account(s). In the example shown in FIG. 11, based on the value of the customer's tax deferred assets, such as, for example IRAs and 401K, and the minimum distribution calculation method, the actual distributions and the IRS mandated minimum distributions from the customer's tax deferred account did not vary. Sometimes in order to plan for a better estate with better tax advantages, the customer is advised to exceed the RMD from the tax deferred accounts resulting in actual withdrawals that vary from the RMD.

The preferred embodiment of the invention provides a second RMD withdrawal streams report showing a bar chart of the customer's annual 401K/IRA withdrawals and a bar chart showing the customer's corresponding account balance, as depicted in FIG. 12. FIG. 12 corresponds to the RMD withdrawal streams of FIG. 3 110. FIG. 12 comprises a heading 1001, a bar chart of the annual 401K/IRA withdrawals 1002, and a year end 401K/IRA account balance.

The preferred embodiment of the invention provides a summary of alternatives report, as depicted in FIG. 13. FIG. 13 is an example of summary of alternatives report corresponding to the summary of alternatives of FIG. 3 112. FIG. 13 comprises a heading 1101 and a table 1102, having a current analysis column 1103, a first alternative column 1104, and a second alternative column 1105.

The first alternative column 1104 shows the result of relaxing one of the goals. Relaxing one of the goals is viewed by one skilled in the art as being a non-financial alternative. In this example, the goal relaxed is the estate goal. The second alternative column 1105 shows the result of moderately altering the customer's asset allocation. Altering asset allocation is viewed by one skilled in the art as being a financial alternative. In this example, the asset allocation was changed moderately.

The table shows a Pros row 1106 and a Cons row 1107, which help educate the customer on the impact of the alternatives to the customer's portfolio position and likelihood and method of meeting their goals, so that the customer can make an informed decision.

The preferred embodiment of the invention provides a report on the non-financial alternative, as depicted in FIG. 14. FIG. 14 is an example of the non-financial alternative corresponding to the Alternative I of FIG. 3 113. FIG. 14 comprises a heading 1201, a table 1202, and a bar chart 1203. The table displays the results of applying the first alternative in a format which compares the modified results with the customer's current analysis. The bar chart displays a modified asset draw down showing an alternative estate 1204 next to the current estate 1205. This bar chart 1203 helps the customer to visualize the two different draw downs.

Figure 15:
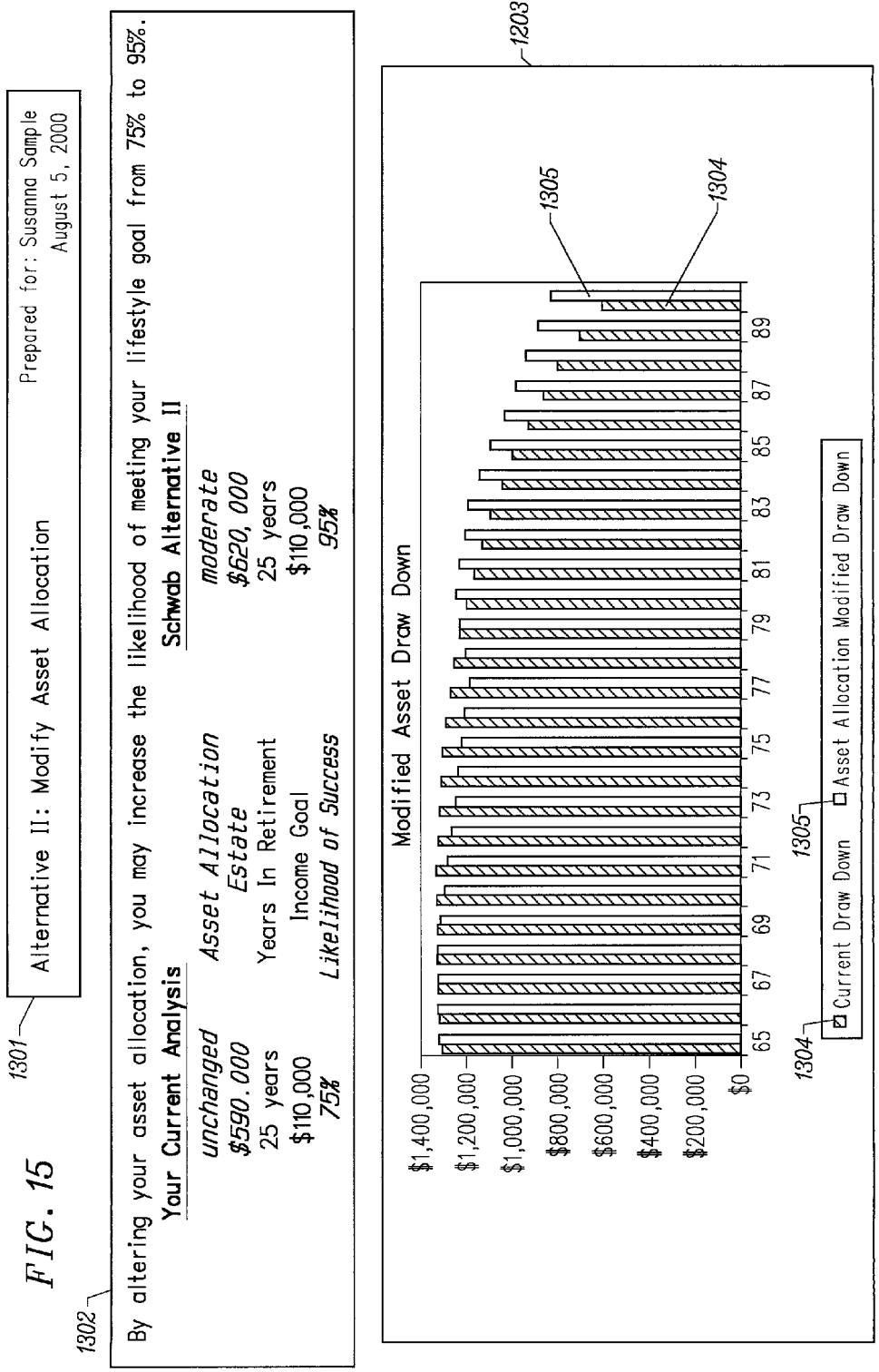
FIG. 15 is an example of the financial alternative according to the invention.

The preferred embodiment of the invention provides a report on the financial alternative, as depicted in FIG. 15. FIG. 15 is an example of the financial alternative corresponding to the Alternative II of FIG. 3 114. FIG. 15 comprises a heading 1301, a table 1302, and a bar chart 1303. The table displays the results of applying the second alternative in a format which compares the modified results with the customer's current analysis. The bar chart displays a modified asset draw down showing an asset allocation modified draw down 1304 next to the current draw down 1305. This bar chart 1303 helps the customer to visualize the two different draw downs.

The preferred embodiment of the invention provides a report on the financial alternative, as depicted in FIG. 16. FIG. 16 is an example of more information than displayed in FIG. 15 corresponding to the Alternative II of FIG. 3 114. FIG. 16 comprises a heading 1401, a section containing pie charts 1402, a section containing explanations 1403, and a section containing the legend for the bar charts 1404. The reports shows the customer the results of analysis discussed, including likelihood of customer achieving in-retirement goal, of the customer reallocating the portfolio taking into account customer preferences, such as, altering the diversification of the customer's portfolio.

The preferred embodiment of the invention provides an action plan report with respect to the customer's financial alternatives, as depicted in FIG. 17. FIG. 17 is an example of the action plan corresponding to the Alternative II Action Plan of FIG. 3 116. FIG. 17 comprises a heading 1401, a section 1502 containing a summary of financial standings and the analysis on the customer's portfolio's assets to aid the customer in deciding an action plan, the action plan comprising activities such as, for example, buying or selling small company holdings.

The preferred embodiment of the invention provides an action plan report with respect to the customer's financial alternative, as depicted in FIG. 18. FIG. 18 is an example of the action plan corresponding to the Alternative II Action Plan of FIG. 3 116. FIG. 18 comprises a heading 1401, a section 1602 containing a summary of financial standings and the analysis on the customer's portfolio's assets to aid the customer in deciding an action plan, the action plan comprising activities such as, for example, buying or selling large company holdings.

The preferred embodiment of the invention provides an action plan report with respect to the customer's financial alternative, as depicted in FIG. 19. FIG. 19 is an example of the action plan corresponding to the Alternative II Action Plan of FIG. 3 116. FIG. 19 comprises a heading 1701, a section 1702 containing a summary of financial standings and the analysis on the customer's portfolio's assets to aid the customer in deciding an action plan, the action plan comprising activities such as, for example, buying or selling international holdings.

The preferred embodiment of the invention provides an action plan report with respect to the customer's financial alternative, as depicted in FIG. 20. FIG. 20 is an example of the action plan corresponding to the Alternative II Action Plan of FIG. 3 116. FIG. 20 comprises a heading 1901 and a section 1902 containing the action plan comprising activities such as, for example, buying or selling fixed income holdings.

An Exemplary Method For Determining Cash Flows and Performance Planning

Figure 21:
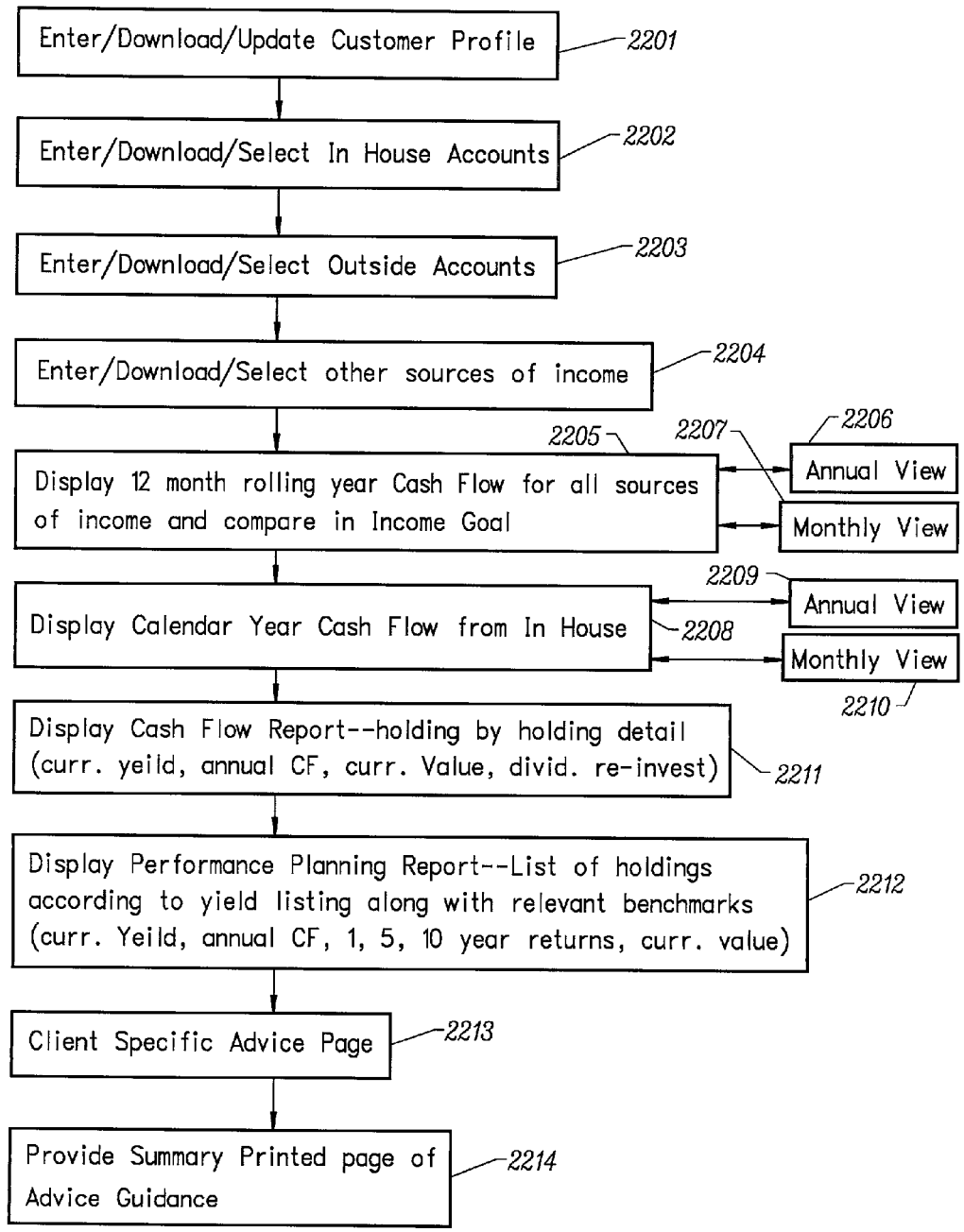
FIG. 21 is a flow diagram determining a customer's cash flows and portfolio performance according to the invention.

The preferred embodiment of the invention provides an exemplary method for calculating cash flows and performance planning as discussed with reference to FIG. 21. FIG. 21 is a flow diagram of an end user, such as a customer, or a branch office representative, determining a customer's cash flows and portfolio performance according to the invention. End users can:

- Download/enter/update a customer profile and obtain income goal (2201);
- Import/display/enter/edit a customer's in house accounts (2202);
- Import/display/enter/edit a customer's outside accounts' assets (2203);
- Import/display/enter/edit a customer's other non-security sources of income (2204);
- Graphically display 12-month rolling or historic rolling year cash flow generated from all sources of income by cash flow category and compare to customer's income goal (2205), in bar chart format and table, for example, and choose provided option to view same data on an annual (2206) and monthly basis (2207);
- Graphically display 12 month rolling or historic rolling year dividend and interest cash flow generated from in-house-only accounts by cash flow category and compare to annual cash flow goal (2208), in bar chart format and table, and choose provided option to view the information in greater detail and on an annual basis (2209) and monthly basis (2210);
- Display cash flow including: each security's estimated annual cash flows, current yield, current value, dividend reinvestment status all by cash flow category, relevant cash flow category benchmarks, and a calculation of the total dollar sum of dividends re-invested, i.e. foregone cash flow, for the calendar year under analysis (2211);
- Display cash flow versus growth performance including: a listing of all assets by approximate current yield, annual income by asset, current yield, one, five, and ten year total return data, current value, and relevant cash flow category benchmarks allowing the customer to compare asset's performance to relevant cash flow category benchmarks and historical performance where appropriate (2212);
- View a provided general advice page highlighting underperforming assets consider both growth and income components of each asset's return, and make general recommendations for narrowing/closing cash flow shortfalls (2213); and
- View a provided full printed report (2214).

Exemplary Method in Detail

The exemplary method, also referred to below as the income planner, for determining cash flows and performance planning is described in further detail below, organized into logical blocks or modules, as follows.

Module 1: Complete/Update Customer Profile

Where possible, the end user downloads a customer's profile of demographic and account information, for example, from previous planning tool sessions. The end user is able to confirm the information and update it manually as necessary. See Table I below for a list of data requirements.

Additionally, in this module, the customer's annual cash flow goal can be ascertained. The attainment of the customer's cash flow goal may differ between retail branch and phone versus customer center tools. The customer seeking the assistance of a branch or phone representative would likely come to his appointment with a number in mind, while the customer center client is more likely to need assistance to calculate this number accurately. It should be appreciated that for the customer center tool it may be appropriate to include additional functionality, such as, for example, income goal worksheets.

Module 2: Choose Customer In House Account Holdings for use in Income Planning Analysis The first step in analyzing cash flow generated by a customer's current portfolio is to evaluate current assets. The invention allows the customer to analyze cash flow from all of the assets in the customer's in house accounts, or a customer-identified subset, as well as any outside accounts/holdings that the customer enters either via other tools or manually.

Wherever possible, the exemplary method determines if the customer has data captured by other tools and imports that data for both in house and outside account data. The method allows the end user, sometimes the customer, to import all relevant information and edit/update the data for each session/interaction. See Table I below for a list of data requirements.

Because a customer may have several accounts in house that the customer would like to include in the cash flow analysis, the end user is able to specify which accounts to include.

Once the user selects accounts to be included in the cash flow analysis, the method provides for generating reports and tables summarizing all customer's in house positions. The positions are also classified into all relevant asset categories. See below for listing of all six categories.

Module 3: Choose/Enter Customer Outside Account Holdings for use in the Income Planning Analysis The end user is able to incorporate positions held in outside accounts. The method in-retirement income planner draws on the database for outside holdings when created by in house tools. Hence an end user only has to enter outside holdings once.

If the customer has not used in house tools or products, or would like to update holdings information, the method allows the end user to enter any holdings held outside manually.

It should be appreciated that the method requires the following information be captured for all holdings:

1. Which financial institution currently houses the holdings, such as, for example, brokerage Account, Bank Account, and Mutual Fund Company, that is, a name/title must be ascribed; and 2. Is the holding a tax-deferred account, such as, for example, 401(k), IRA, SEP, and the like.

Additionally, for mutual funds, equities and bonds, the customer must provide:

The CUSIP or symbol;
The number of shares held; and
Dividends Re-invested (yes/no).

The method identifies the ticker symbol or name entered and returns the company/fund name or ticker, respectively. If the user does not enter the CUSIP, the system identifies and stores the CUSIP associated with the entered Ticker symbol on the back end. The CUSIP serves as the income planner's holdings identifier on the back end.

The method provides for calculating the total value of the position entered by multiplying the number of shares held by the current price. The method captures the asset's current price through an existing, internal data feed. Current prices are of previous business day's market close. The pricing data feed is be updated nightly.

It should be appreciated that the method captures the tax status of the account in which the investment is held, such as, for example, taxable, tax deferred, and tax-free.

It should also be appreciated that the method verifies if a listed outside security is in the database, and if not, the method prompts the user to enter an investment description, dollar amount, and other required information.

Module 4: Edit/Enter Customer other non-security income sources for use in the Income Planning Analysis As non-financial assets form a critical part of many investor's portfolio, the cash flows generated must also be captured. These sources of cash flow will include items such as social security, income property, and part-time/full-time employment payments. Such investments need to be entered and updated manually.

For Cash and Other Investments, the customer must provide:

The security type: name/description of asset: Money Market Mutual Fund, Checking Account, annuity, pension payment, UITs, REITs, options, and the like;
The current value of the asset where applicable;
Current cash flow Stream; and
Frequency of Current cash flow Stream.

A unique data entry screen is preferred for the se investments.

For this module, the user must be able to indicate which specific months the end user expects to receive each cash flow, or indicate if the receipt of cash flow is recurring and thereby set a start/end date. For example, a situation might be if the end user has summer employment the months of June through August only.

Analyze Customer Cash Flow from customer defined portfolio: Modules 2-4

Once a customer has selected the holdings to be analyzed, the assets are classified into one of six asset categories:

1. Social Security Cash Flow—customer provided or calculated in house;
2. Income Property Cash Flow—customer provided;
3. Fixed Income Cash Flow—calculated in house from customer data or customer provided data;
4. Equity Cash Flow—calculated in house from customer data or customer provided data;
5. Cash—calculated in house from customer data or customer provided data; and
6. Other (annuities, pension, post-retirement employment . . . ) in house from customer data.

See Table II below for a mapping of in house positions as defined by issue class ID.

The method provides a summary of all the selected investment accounts and holdings under consideration by account and dollar value. In order to ensure that the data captured is, at a minimum, consistent with the data captured by the other tools, it also can capture the tax status of the holdings under consideration. By selecting a specific holding, the user is able to display all positions held within the account and include: symbol/CUSIP, name, quantity, current price, and dollar amount.

Positions held in house as well as outside holdings and other sources of income are classified into one of the six asset categories listed above. The method maps positions to asset categories. The following schema is used to map in house and outside holdings:

Create a map to aggregate asset class information and map this information into the six asset categories cited above;
Use any in house classification database to map to asset class;
For mutual funds, use the ticker symbol to look up the Morningstar fund category and use an existing mapping of Morningstar category to asset class, such as, in Table III below, to determine the asset class. Match mutual fund data to the Morningstar category;
For individual stocks, use the ticker symbol to look up classification information from the S&P data feed:
Stocks with an International designation (ADR) should be mapped to the International Equity class;
Domestic stocks with market capitalization >$1 billion map to Large Company Equity; and
Stocks with market capitalization <$1 billion map to Small Company Equity.

Each time a customer uses the method and enters new data or updates information, the method recalculates all information and generates new tables and charts. If the information changes the results, an mechanism, such as a pop-up window, indicates that the changes due to updated information should appear.

Module 5: Display Calendar Year Cash Flow from All Sources of Income and Compare to Stated Cash Flow Goal Modules 5 through 7 allow the end user to evaluate the current dividend and interest cash flow situation from several views:
cash flow from all sources of income;
cash flow from in house holdings; and,
cash flow from outside holdings.

The tables and analyses in modules 5 through 9, are based on the data entered and calculations performed in modules 2 through 4.

In Module 5, the end user is able to generate a chart displaying a snapshot of the 12 month rolling or historic rolling year dividend and interest cash flow generated by a customer's current portfolio from all sources. The bar chart illustrates the customer's current rolling or historic rolling year cash flow by cash flow category and compares it to the customer's income goal. The chart accompanies a summary of data entered and income goals. The method calculates shortfall or surplus and notifies the user. Disclaimers referencing that the analysis is based on the data provided by the customer and changing market data is provided. The method provides for indicators to inform the customer whether the customer's current assets generate sufficient cash flows or not, for example:
Goal Met:
Goal Surpassed:
Cash Flow Shortfall:

For information on generating additional income/cash flows, the end user is be directed to a Variety of links. The method provides for several avenues for the customer to pursue in narrowing his cash flow gap such as:
examining the performance of his current portfolio (proceed to the data analysis portion of the planner);
re-assess his current asset allocation (provide general guidance on asset allocation, importance of having a growth component to portfolio);
consider drawing down on his assets (and/or not reinvesting his dividends); and/or
reassessing income needs/goal.

In each of the listed scenarios, the customer has the option to see cash flows in greater detail and viewing these cash flows from a quarterly versus annual view and/or monthly versus annual view. Such detailed views draws customer attention to uneven income flows and, possibly highlight investment vehicles that may help diminish problematic fluctuations.

The method provides the user with information/education on hitting an annual cash flow goal versus the need to smooth monthly cash flows. If the customer's cash flow analysis indicates problematic fluctuations (periods in which the actual monthly cash flow generated falls below the average monthly cash flow goal by 5 percent or more) the customer is alerted. In this case, the customer is provided with information on the pros/cons of various fixed income products, equity categories and the mutual funds. Additionally, email hyperlinks and/or telephone numbers for the other channels of information, such as, fixed income, stocks, and utilities are provided for the customer center user allowing the customer to obtain more information.

An "income goal" line would run through the detail charts to illustrate the difference between the customer's cash flow goal and current cash flow status.

The method provides the user with information/education on asset/portfolio allocation and appropriate diversification. It provides links to an asset allocation.

Module 6: Display Calendar Year Cash Flow from In House Holdings Only and Compare to Stated Cash Flow Goal (Optional)

Module 6 allows the user to evaluate the customer's current cash flow status from an in house only perspective for business purposes.

As in Module 5, in Module 6 the user should be able to generate a chart displaying a snapshot of the cash flow generated by a customer's current in house holdings. The chart illustrates the customer's current 12 month rolling or historic rolling year cash flow by cash flow category and compares it to customer's income goal. The end user has the option to see their cash flows in greater detail by viewing these cash flows from a quarterly versus annual view and/or monthly versus annual view.

As in Module 5, an "income goal" line would run through the detail charts to illustrate the difference between the customer's in house holdings generated cash flow and cash flow goal. A table with supporting detail is provided.

Module 7: Display Cash Flow Report

Module 7 serves as a precursor to module 8 in which the user is able to analyze the income and growth performance of the customer's individual assets, engage in a conversation or interactive advice session and, in the future, make recommendations about growth and income investments.

In this Module, the income planner constructs a table that lists all the customer's individual assets by cash flow category, summarizes the individual annual cash flows, current yield and total value of each asset. It also displays relevant benchmark data for each cash flow category as a point of reference for the user to assess the status of his cash flow situation.

The income planner provides additional education/information on the meaning of the benchmarks and how they might guide a customer's investment decisions.

Approximate current yields are calculated based on numbers already made available for module 3, by dividing the total annual dividend income for each asset by the total current value of each respective asset.

Additionally, this table notes in which instances dividends are being reinvested and in which instances the customer is accessing the dividends. It calculates the sum of total forgone income represented by reinvested dividends and calculates what percentage of dividends a customer is currently reinvesting versus accessing. This information highlights potentially overlooked sources of income.

The method provides additional education/information on dividend re-investment. While the income planner alerts the customer to the amount cash flow currently being foregone by reinvesting dividends, an indicator highlights the impact on future growth/income of accessing those dividend streams (instead of re-investing them) now. From this information, the user is able to enter different withdrawal (dividend accessing) scenarios and see the impact on the future growth and/or income of his assets.

Module 8: Listing Assets by Current Yield (Cash Flow versus Growth Performance Table)

Module 8 takes information provided in Module 7 and lists customer's holdings by yield as well as provides information on each asset's annual income, 1-year and 5-year total returns, and current value. With this information the financial institution eventually is able to make cash flow and growth recommendations to the customer to help the customer generate more income from the portfolio.

The method provides an explanation of income versus growth investing. It also provides information from current research on income/growth allocation of a near and in-retirement investor. It also provides a discussion of optimal investment strategies for investors seeking a steady stream of income over a series of years versus increasing likelihood a customer will not run out of money. Users are able to access an asset allocation tool to reassess/reallocate the portfolio.

This presentation of data allows a branch representative to engage in a conversation about the customer's portfolio and compare individual asset performance to relevant benchmarks. It also allows the user to evaluate the income-generating portfolio. For example, if one of the asset's yields were low, the user would examine the asset's 1, 5, and 10-year total return. For assets with approximate current yield and total return both low (failing to capture either income or growth), the in house institution may recommend that the customer divest of that asset and shift resources to better performing investment vehicles or securities.

The method provides information to the user on how the user might improve the performance of the portfolio. Such applies to users who have a cash flow shortfall as well as those who are meeting/exceeding their goal. The user is assisted in selecting alternative investment vehicles or securities within the given cash flow category/class to replace under-performing ones with links to in house tools and services.

By juxtaposing which of the customer's assets' against their relevant benchmark and recommending a course of action, the branch representative or the customer center client advice giving features are able to help the customer enhance portfolio performance. Additionally, the method provides the financial institution with an opportunity to guide customers toward a variety of investment vehicles that may allow the customer to better meet their in-retirement goals.

Module 9: Display General Advice Page

A general advice page is provided that provides the user with information and general recommendations in an easy to read and understandable summary format. The advice is based on analysis displayed in Modules 8 and 9. The purpose of this module is to identify next steps on how the customer can meet income goals, i.e. reduce a shortfall or evaluate current investments.

This Module

Provides a set of next steps on how to reduce any shortfall, i.e. evaluate current holdings, conduct a general rebalance, examine under-performing assets, reassess objectives and goal;

Outlines how the financial institution can help in each of the above areas, i.e. visit branch representative, use portfolio allocation or rebalancing tools; and Provide alternate strategies for fixed income, i.e. laddered or dedicated bond portfolio.

Module 10: Provide a Printed Full Report

Module 10 represents the customer take-away or personalized action plan. The customer is provided with a printed copy of recommendations and guidance and a copy of all the supporting graphs, tables and charts.

TABLE I

Income Planner Data Requirements

| | In House Account | Outside Account | Variables |
|---|---|---|---|
| Money Market Instruments | Yes | Yes | Symbol or identifier or CUSIP |
| T-Bills (see below) | | | Name |
| Fed Funds | | | Current dollar amount |
| Commercial Paper | | | Current yield/interest rate |
| | | | Payment period (mo, qtr, etc)—as appropriate |
| | | | Maturity Date |
| | | | Term |
| | | | Par value |
| Checking Account, Cash or Cash Equivalents | No Access? | Yes | Symbol or identifier |
| | | | Name |
| | | | Current dollar amount |
| | | | Current yield/interest rate |
| | | | Payment period (mo, qtr, etc) |
| Money Market Mutual Funds | Yes | Yes | Symbol or identifier or CUSIP |
| | | | Name |
| | | | Current shares held |
| | | | Current price per share |
| | | | Current yield/interest rate |
| | | | Payment period (mo, qtr, etc) |
| Certificate of Deposit (CD) | Yes | Yes | Symbol or identifier or CUSIP |
| | | | Name |
| | | | Current dollar amount |
| | | | Current yield/interest rate |
| | | | Date of maturity |
| | | | Term |
| Treasury Bills (3, 6, and 12 month maturities) | Yes | Yes | CUSIP number |
| | | | Name |
| Issued at a discount | | | Current dollar amount |
| | | | Issue Date |
| | | | Frequency |
| | | | Current yield/interest rate |
| | | | Maturity Date |
| | | | Term |
| | | | Par value |
| | | | Purchase price |
| Treasury Notes and Bonds | Yes | Yes | CUSIP number |
| | | | Name |
| Notes: term 1 to 10 yrs | | | Number of units owned |
| Bonds: term 10 to 30 yrs Both issued in $1,000 multiples | | | Current price per unit |
| | | | Coupon rate |
| | | | Issue Date |
| | | | Frequency |
| | | | Par value |

TABLE I-continued

Income Planner Data Requirements

| | In House Account | Outside Account | Variables |
|---|---|---|---|
| Gov't Agency Bonds<br>Fed Home Loan Banks<br>Fed National Mortgage Asso<br>Gov't National Mortgage Asso<br>Fed Home Loan Mortgage<br>Other Gov't Agency<br>CMO's | Yes | Yes | Maturity date<br>Call date<br>Dividend Re-invested (yes/no)<br>1 year total returns<br>5 year total returns<br>Credit rating<br>Yield to Maturity<br>In Default flag<br>CUSIP number<br>Name<br>Number of units owned<br>Current price per unit<br>Coupon rate<br>Issue Date<br>Frequency<br>Par Value<br>Maturity Date<br>Call date<br>Dividend Re-invested (yes/no)<br>1 year total returns<br>5 year total returns<br>Credit rating<br>Yield to Maturity<br>In Default flag |
| Muni Bonds | Yes | Yes | CUSIP number<br>Name<br>Number of units owned<br>Current price per unit<br>Coupon rate<br>Issue Date<br>Frequency<br>Par Value<br>Maturity date<br>Call date<br>Dividend Re-invested (yes/no)<br>1 year total returns<br>5 year total returns<br>Credit rating<br>Yield to Maturity<br>In Default flag |
| Corporate Bonds | Yes | Yes | CUSIP number<br>Name<br>Number of units owned<br>Current price per unit<br>Coupon rate<br>Issue Date<br>Frequency<br>Par value<br>Maturity date<br>Call date<br>Dividend Re-invested (yes/no)<br>1 year total returns<br>5 year total returns<br>Credit rating<br>Yield to Maturity<br>In Default flag |
| Preferred Stock | Yes | Yes | Symbol or identifier or CUSIP<br>Name<br>Number of shares owned<br>Current Price per share<br>Last Dividend Payment per share<br>Dividend payment dates<br>Last Dividend Payment Date<br>Par value<br>1 year total returns<br>5 year total returns |
| Equities<br>U.S.<br>ADRs<br>Int'l | Yes | Yes | Symbol or identifier or CUSIP<br>Name<br>Number of shares owned<br>Current price per share<br>All Current Calendar Year Dividend Payments per share<br>Dividend payment dates<br>(associated with above payments)<br>Frequency<br>1 year total returns<br>5 year total returns<br>Dividend Re-invested (yes/no) |
| Mutual Funds | Yes | Yes | Symbol or identifier or CUSIP<br>Name<br>Number of shares owned<br>Current price per share<br>Last dividend payment per share<br>Dividend payment dates<br>1 year total returns<br>5 year total returns<br>Dividend Re-invested (yes/no) |
| UIT's, REITs<br>Closed-end funds | Yes | Yes | Symbol or identifier or CUSIP<br>Name<br>Number of shares owned<br>Current price per share<br>Last dividend payment per share<br>Dividend Payment Dates<br>1 year total returns<br>5 year total returns<br>Dividend Re-invested (yes/no) |
| Variable Annuities | Yes | Yes | Symbol or identifier or CUSIP<br>Name<br>Number of units owned<br>Current price<br>Payment<br>Payment frequency<br>1 year total returns<br>5 year total returns |
| Non Financial Assets with Income | | | |
| Real Estate (non REITs) | No | Yes | Name<br>Current value<br>Current income stream<br>Current income stream frequency |

TABLE II

| Issue Class | ISSUE CLASS DS | Investment Checkup Asset Class | Income Planner Cash Flow Category |
|---|---|---|---|
| OPTNEQT: | | Other | Other |
| OPTN: | OPTION | Other | Other |
| OPTNFC: | FOREIGN CURRENCY OPTION | Other | Other |
| OPTNIND: | INDEX OPTION | Other | Other |
| OPTNINDB: | BROAD BASED INDEX OPTION | Other | Other |
| OPTNINDN: | NARROW BASED INDEX OPTION | Other | Other |
| CORPB: | CORPORATE BOND | Fixed Income | Fixed Income |
| CORPBCPN: | CORPORATE BOND COUPON | Fixed Income | Fixed Income |
| CORPBCNV: | CORPORATE BOND CONVERTIBLE | Fixed Income | Fixed Income |
| CORPBOID: | CORPORATE BOND ORIGINAL ISSUE DISCOUNT | Fixed Income | Fixed Income |
| INSRNC: | INSURANCE | Other | Other |
| MORTBS: | MORTGAGE BACKED SECURITY | Fixed Income | Fixed Income |
| MONYMI: | MONEY MARKET INSTRUMENTS (MATURITY DATE | Cash | Cash |
| REALES: | REAL ESTATE | Other | Income Property |
| USERSEC: | USER DEFINED | Other | Other |
| INDEX: | INDEX MASTER | Other | Other |
| CMRCLP: | COMMERCIAL PAPER | Cash | Cash |
| GOVAGCPN: | GOVERNMENT AGENCY COUPON | Fixed Income | Fixed Income |
| PRVTD: | PRIVATE DEBT (NO SECONDARY MARKET) | Fixed Income | Fixed Income |
| PRVTDCNV: | PRIVATE DEBT CONVERTIBLE | Fixed Income | Fixed Income |
| REORGE: | REORGANIZED EQUITY SECURITY | Equity | Equity |
| GOVAG: | GOVERNMENT AGENCY | Fixed Income | Fixed Income |
| GOVAGOID: | GOVERNMENT AGENCY ORIGINAL ISSUE DISCOU | Fixed Income | Fixed Income |
| GOVAGDIS: | GOVERNMENT AGENCY DISCOUNT | Fixed Income | Fixed Income |
| BANKACP: | BANKERS ACCEPTANCE | Cash | Cash |
| CD: | CERTIFICATE OF DEPOSIT | Cash | Cash |
| MONYM: | MONEY MARKET | Cash | Cash |
| PRFMM: | PREFERRED MONEY MARKET/ MUNI PREFERRED | Cash | Cash |
| CMO: | COLLATERALIZED MORTGAGE OBLIGATION | Fixed Income | Fixed Income |
| MORTBPT: | MORTGAGE BACKED PASS-THROUGH | Fixed Income | Fixed Income |
| UIT: | UNIT INVESTMENT TRUST (TRUST FIXED GROU | Other | Other |
| REORGD: | REORGANIZED DEBT SECURITY | Fixed Income | Fixed Income |
| WID: | WHEN ISSUED DEBT SECURITY | Fixed Income | Fixed Income |
| WIS: | WHEN ISSUED EQUITY SECURITY | Equity | Equity |
| PLEDGE: | OCC PLEDGED SECURITY | Other | Other |
| BASKT: | BASKET | Other | Other |
| FUTR: | FUTURE | Other | Other |
| MIXUNIT: | LIMITED PARTNERSHIP | Other | Other |
| DUSERSEC: | USER DEFINED DEBT | Fixed Income | Fixed Income |
| EUSERSEC: | USER DEFINED EQUITY | Equity | Equity |
| DERV: | DERIVIATIVE—FIN INSTR WHOSE VALUE IS | Other | Other |
| COMDTY: | COMMODITY— BULK GOODS TRADED ON A COMM | Other | Other |
| DEBT: | DEBT | Fixed Income | Fixed Income |
| ABS: | ASSET BACKED SECURITY | Fixed Income | Fixed Income |
| MUNIB: | MUNICIPAL BOND (MUNICIPALITY DEBT) | Fixed Income | Fixed Income |
| MUNIBCPN: | MUNICIPAL BOND COUPON | Fixed Income | Fixed Income |
| MUNIBOID: | MUNICIPAL BOND ORIGINAL ISSUE DISCOUNT | Fixed Income | Fixed Income |
| O: | OPEN ENDED MUTUAL FUND | Equity | Equity |
| BND: | BOND FUND | Fixed Income | Fixed Income |
| TREAS: | TREASURY (GOVERNMENT DEPT) | Fixed Income | Fixed Income |
| TREASBIL: | TREASURY BILL | Fixed Income | Fixed Income |
| TREASSTR: | TREASURY STRIP | Fixed Income | Fixed Income |
| TREASCPN: | TREASURY COUPON | Fixed Income | Fixed Income |
| EQTY: | EQUITY | Equity | Equity |
| RIGHT: | RIGHT | Other | Other |
| WARNT: | WARRANT | Other | Other |
| ADR: | AMERICAN DEPOSITORY RECEIPT | International | Equity |
| CEMF: | CLOSED END MUTUAL FUND | Other | Other |
| LIMITP: | LIMITED PARTNERSHIP | Other | Other |
| REIT: | REAL ESTATE INVESTMENT TRUST | Equity | Income Property |
| STOCK: | STOCK | Equity | Equity |
| STOCKCOM: | COMMON STOCK | Equity | Equity |
| STOCKPRE: | PREFERRED STOCK | Equity | Equity |
| STOCKCPR: | CONVERTIBLE PREFERRED STOCK | Equity | Equity |
| CUMCPR: | CUMULATIVE CONVERTIBLE PREFERRED STOCK | Equity | Equity |
| MMF | MONEY MARKET FUND | Cash | Cash |
| Else | USER DEFINED DEBT | Other | Other |
| Synthpre | Synthetic Preferred | Other | Other |
| WI | | Other | Other |
| Reorg | | Other | Other |
| Treasrnk | | Fixed Income | Fixed Income |

TABLE III

Morningstar to In House Mapping Table

| Moringstar Category Categories | In House Asset Class | IP Cash Flow |
|---|---|---|
| 1. Convertibles | Other | Other |
| 2. Diversified Emerging Markets | International | Equity |

TABLE III-continued

Morningstar to In House Mapping Table

| Moringstar Category Categories | In House Asset Class | IP Cash Flow |
|---|---|---|
| 3. Diversified Pacific/Asia Stk | International | Equity |
| 4. Domestic Hybrid | Other | Other |
| 5. Europe Stock | International | Equity |
| 6. Foreign Stock | International | Equity |
| 7. High Yield Bond | Fixed Income | FI |
| 8. Intermediate Government | Fixed Income | FI |
| 9. Intermediate-Term Bond | Fixed Income | FI |
| 10. International Bond | Fixed Income | FI |
| 11. International Hybrid | International | Equity |
| 12. Japan Stock | International | Equity |
| 13. Large Blend | Large Company | Equity |
| 14. Large Value | Large Company | Equity |
| 15. Large Growth | Large Company | Equity |
| 16. Latin America Stock | International | Equity |
| 17. Long Government | Fixed Income | FI |
| 18. Long-Term Bond | Fixed Income | FI |
| 19. Mid Cap Blend | Large Company | Equity |
| 20. Mid-Cap Growth | Large Company | Equity |
| 21. Mid-Cap Value | Large Company | Equity |
| 22. Multisector Bond | Fixed Income | FI |
| 23. Muni National Intermediate | Fixed Income | FI |
| 24. Muni National Long | Fixed Income | FI |
| 25. Muni Short | Fixed Income | FI |
| 26. Muni Single State Intermediate | Fixed Income | FI |
| 27. Muni Single State Long | Fixed Income | FI |
| 28. Pacific/Asia ex-Japan Stock | International | Equity |
| 29. Short Government | Fixed Income | FI |
| 30. Short Term Bond | Fixed Income | FI |
| 31. Small Blend | Small Company | Equity |
| 32. Small Growth | Small Company | Equity |
| 33. Small Value | Small Value | Equity |
| 34. Specialty—Communications | Other | Equity |
| 35. Specialty—Financial | Other | Equity |
| 36. Specialty—Health | Other | Equity |
| 37. Specialty—Natural Resources | Other | Classification Equity |
| 38. Specialty—Precious Metals | Other | Changed to Equity |
| 39. Specialty—Real Estate | Other | Sm/Med/Lrg Equity |
| 40. Specialty—Technology | Other | Company Equity |
| 41. Specialty—Unaligned | Other | Equity |
| 42. Specialty—Utilities | Other | Equity |
| 43. Ultrashort Bond | Fixed Income | FI |
| 44. World Stock | International | Equity |
| 45. Emerging Markets Bond | Fixed Income | FI |
| 46. Municipal New York Intermediate | Fixed Income | FI |
| 47. Municipal New York Long Term | Fixed Income | FI |
| 48. Municipal California Intermediate | Fixed Income | FI |
| 49. Municipal California Long Term | Fixed Income | FI |

Although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method for using a desktop including a display for forecasting a likelihood that a customer's assets held in a plurality of different types of customer accounts at retirement meet in-retirement goals, including an annual income withdrawal goal, an estate goal, and a years in retirement goal, the method comprising:

inputting said annual income withdrawal goal, said estate goal, said years in retirement goal, and a current asset allocation, and identifying one of said in-retirement goals as a priority goal;

inputting customer financial information including: (1) financial holdings from both inside and outside financial institutions and which financial institutions currently house the financial holdings; (2) whether each financial holding is a tax-deferred account; (3) input from other income planning tools including retirement planning and investment verification applications; and (4) for equities, bonds, or mutual funds, the CUSIP or symbol, number of shares held, and whether the dividends are being reinvested;

performing an analysis based on the customer financial information, said in-retirement goals, and said current asset allocation;

forecasting, by using results of said analysis, said likelihood that said customer assets at retirement meet said priority goal;

providing an in-retirement income stream withdrawal strategy, wherein said income stream withdrawal strategy provides tax advantages and wherein said income stream withdrawal strategy provides for a first time period and said income stream withdrawal strategy avoids withdrawal of assets from tax-deferred accounts during the first time period, and said income stream withdrawal strategy providing for withdrawal from one or more tax-deferred accounts during a second time period;

displaying a findings overview report based on said analysis to the customer, wherein the findings overview report includes the in-retirement goals, and the likelihood that the priority goal will be met if the in-retirement income stream withdrawal strategy is followed, wherein the likelihood is displayed as a percentage, and the findings overview report further including an asset drawn down schedule which shows a predicted end of year account balance for each of the plurality of different types of customer accounts if the in-retirement income stream withdrawal strategy is followed;

projecting annual snapshot cash flows from said current asset allocation and determining if a gap exists between said projected cash flows and said income goal, wherein both the inside and outside investments are analyzed to determine the projected cash flows;

displaying a current performance planning table to the customer, wherein said current performance planning table includes current yield and total return information to determine which holdings of said assets provide cash flow versus growth required to meet said in-retirement goals, and further wherein said current performance planning table includes information on each asset's annual income, 1-year and 5-year total returns, and current value, wherein the findings overview report, asset draw down schedule, and current performance planning table are displayed to the customer to assist in determining the likelihood of meeting the customer's in-retirement goals as well as to assist in determining whether to perform an alternative analysis based on reprioritized in-retirement goals to improve the customer's likelihood of meeting the in-retirement goals, wherein the alternative analysis at least includes an analysis based on altering the customer's current asset allocation or relaxing at least one of the in-retirement goals;

performing the alternative analysis by recalculating information based on the reprioritized in-retirement goals, wherein the likelihood of meeting the in-retirement goals is determined while all other goals are held constant;

displaying a modified findings overview report, asset draw down schedule, and current performance planning table based on the alternative analysis; and recommending a course of action based on juxtaposing the customer's current asset allocation against relevant benchmarks for each cash flow category.

2. The method of claim 1, wherein said forecasting is based on outside and inside holdings, wherein the customer's outside holdings are accessed from a database of outside holdings.

3. The method of claim 1, wherein said cash flows comprise dividend and interest sources, and non-fluctuating sources.

4. The method of claim 3, wherein said dividend and interest sources comprise equity dividend, fixed income, and cash payments, and wherein said non-fluctuating sources comprise income property, social security, and pension payments.

5. The method of claim 1, further comprising generating a current summary showing a breakdown of said cash flow into said dividend and interest sources, said non-fluctuating sources, total cash flow, and said income goal.

6. The method of claim 1, wherein said withdrawal strategy further comprises designating when and how much to withdraw from taxable, 401K, traditional IRA, and Roth IRA accounts.

7. The method of claim 1, further comprising determining required minimum distribution (RMD) income streams based on total value of tax-deferred assets.

8. The method of claim 7, further comprising generating a report showing annual tax-deferred account withdrawals, and year-end tax-deferred account balances.

9. The method of claim 1, further comprising providing financial and non-financial alternatives in order to attempt to increase said likelihood of meeting said retirement goals.

10. The method of claim 9, wherein said non-financial alternatives increase said likelihood by requiring a relaxing of at least one of said in-retirement goals.

11. The method of claim 9, wherein said financial alternatives attempt to increase said likelihood by altering said asset allocation and thereby assuming a better diversified portfolio.

12. The method of claim 10, further comprising generating a report showing said in-retirement goals and said likelihood versus said modified in-retirement goals, said modified in-retirement goals comprising said at least one of said relaxed in-retirement goals, and showing said subsequent possible increased likelihood.

13. The method of claim 11, further comprising generating a report showing, using the display, said in-retirement goals and said likelihood versus said altered asset allocation, and showing, using the display, said subsequent possible increased likelihood.

14. The method of claim 11, wherein asset allocation preferences are incorporated.

15. The method of claim 11, further comprising providing action plans for attempting to increase said likelihood, said action plans comprising means for conveying whether to buy or sell said assets.

16. The method of claim 15, wherein each asset class holding is separated from each other and small company holdings are separated from large, international, and fixed income company holdings.

17. The method of claim 1 further comprising providing a performance planning report which identifies each of the assets held in the customer accounts and provides a projected annual cash flow, an approximate current yield, a historical total return, and an approximated current value for each asset, to assist the customer in assessing their assets on an income versus growth basis.

18. The method of claim 2, further comprising acquiring an asset's current price through an existing, internal data feed updated nightly.

19. The method of claim 1, further comprising alerting a user when a cash flow analysis indicates a problematic fluctuation.

20. The method of claim 19, wherein the problematic fluctuation is indicated by a period wherein an actual monthly cash flow generated falls below a monthly cash flow goal by five percent or more.

21. The method of claim 1, further comprising the step of calculating a percentage of dividends a customer is currently reinvesting versus accessing.

22. The method of claim 10 wherein the relaxing of at least one of said in-retirement goals comprises relaxing the estate goal.

23. The method of claim 8, wherein the report compares the annual tax-deferred account withdrawals with the required minimum distribution income streams.

24. A method for using a computer for forecasting a likelihood that a customer's assets held in a plurality of different types of customer accounts at retirement meet in-retirement goals, including, an annual income withdrawal goal, an estate goal, and a years in retirement goal, the method comprising:

receiving at the computer said annual income withdrawal goal, said estate goal, said years in retirement goal, and a current asset allocation, and identifying, using the computer, one of said in-retirement goals as a priority goal;

receiving customer financial information at the computer including: (1) financial holdings from both inside and outside financial institutions and which financial institution currently houses the financial holdings; (2) whether each financial holding is a tax-deferred account; (3) input from other income planning tools including retirement planning and investment verification applications; and (4) for equities, bonds, or mutual funds, the CUSIP or symbol, number of shares held, and whether the dividends are being reinvested;

performing, using the computer, an analysis based on the customer financial information, said in-retirement goals, and said current asset allocation;

forecasting, using the computer, by using results of said analysis, said likelihood that said customer assets at retirement will meet said priority goal;

providing, using the computer, an in-retirement income stream withdrawal strategy, wherein said income stream withdrawal strategy provides tax advantages and wherein said income stream withdrawal strategy provides for a first time period and said income stream withdrawal strategy avoids withdrawal of assets from tax-deferred accounts during the first time period, and said income stream withdrawal strategy providing for withdrawal from one or more tax-deferred accounts during a second time period;

displaying, using the computer, a findings overview report based on said analysis to the customer, wherein the findings overview report includes the in-retirement goals, and the likelihood that the priority goal will be met if the in-retirement income stream withdrawal strategy is followed, wherein the likelihood is displayed as a percentage, and the findings overview report further including an asset drawn down schedule which shows a predicted end of year account balance for each of the plurality of different types of customer accounts if the in-retirement income stream withdrawal strategy is followed;

displaying, using the computer, a summary of findings report to the customer, wherein the summary of findings report shows the likelihood for meeting the estate goal, a best case estate result, a worst case estate result, and an expected case estate result;

projecting, using the computer, annual snapshot cash flows from said current asset allocation and determining if a gap exists between said projected cash flows and said income goal, wherein both inside and outside investments are analyzed to determine the projected cash flows;

displaying, using the computer, a current performance planning table to the customer, wherein said current performance planning table includes current yield and total return information to determine which holdings of said assets provide cash flow versus growth required to meet said in-retirement goals, and further wherein said current performance planning table includes information on each asset's annual income, 1-year and 5-year total returns, and current value, wherein the findings overview report, asset draw down schedule, and current performance planning table are displayed to the customer to assist in determining the likelihood of meeting the customer's in-retirement goals as well as to assist in determining whether to perform an alternative analysis based on reprioritized in-retirement goals to improve the customer's likelihood of meeting the in-retirement goals, wherein the alternative analysis at least includes an analysis based on altering the customer's current asset allocation or relaxing at least one of the in-retirement goals;

performing the alternative analysis by recalculating information based on the customer's reprioritized in-retirement goals, wherein the likelihood of meeting the in-retirement goals is determined while all other goals are held constant; and displaying a modified overview findings report, asset draw down, and current performance planning table based on the alternative analysis.

25. The method of claim 24, further comprising acquiring an asset's current price through an existing, internal data feed updated nightly.

26. The method of claim 24, further comprising alerting a user when a cash flow analysis indicates a problematic fluctuation.

27. The method of claim 1, further comprising determining cash flow versus growth for each individual holding of assets to meet the in-retirement goals, wherein the cash flows are broken down to sources of income.

28. The method of claim 1, further comprising identifying individual assets that are providing low yields and low growth rates.

29. The method of claim 1, further comprising highlighting under-performing assets based on both growth and cash flow yields of each holding of assets.

30. The method of claim 24, further comprising identifying individual assets that are providing low yields and low growth rates.

31. The method of claim 24, further comprising highlighting under-performing assets based on both growth and cash flow yields of each holding of assets.

* * * * *